_(12)_ United States Patent
Maekawa et al.

(10) Patent No.: US 6,873,896 B2
(45) Date of Patent: Mar. 29, 2005

(54) DRIVE-FORCE DISTRIBUTION CONTROLLER AND DRIVE-FORCE DISTRIBUTION METHOD FOR FOUR-WHEEL-DRIVE VEHICLE

(75) Inventors: Akio Maekawa, Okazaki (JP); Ryohei Shigeta, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/421,886

(22) Filed: Apr. 24, 2003

(65) Prior Publication Data

US 2003/0201131 A1 Oct. 30, 2003

(30) Foreign Application Priority Data

| Apr. 26, 2002 | (JO) | 2002-126961 |
| Apr. 26, 2002 | (JP) | 2002-126220 |
| Apr. 26, 2002 | (JP) | 2002-126960 |

(51) Int. Cl.$^7$ ............... G06F 17/00; B60T 7/12; G05D 1/00
(52) U.S. Cl. ............... 701/69; 701/85; 701/88; 701/89; 701/90; 477/35; 475/223; 475/224; 180/248
(58) Field of Search ............... 701/69, 85, 88, 701/89, 90; 477/35; 475/223, 224; 180/248

(56) References Cited

U.S. PATENT DOCUMENTS

| 4,773,500 | A | * | 9/1988 | Naito et al. ............... 180/233 |
| 5,010,974 | A | * | 4/1991 | Matsuda ............... 180/233 |
| 5,270,930 | A | | 12/1993 | Ito et al. ............... 701/69 |
| 5,720,688 | A | * | 2/1998 | Wilson et al. ............... 475/221 |
| 6,205,379 | B1 | | 3/2001 | Morisawa et al. ............... 701/22 |
| 6,442,454 | B1 | * | 8/2002 | Akiba et al. ............... 701/22 |
| 6,698,541 | B2 | * | 3/2004 | Sakakiyama ............... 180/233 |
| 6,711,487 | B2 | * | 3/2004 | Murakami et al. ............... 701/69 |

FOREIGN PATENT DOCUMENTS

| JP | 62-12422 | 1/1987 |
| JP | 62-143720 | 6/1987 |
| JP | 10-272955 | 10/1998 |
| JP | 2001-225654 | 8/2001 |
| JP | 2002-87102 | 3/2002 |

OTHER PUBLICATIONS

U.S. Appl. No. 10/421,886, filed Apr. 24, 2003, Maekawa et al.
U.S. Appl. No. 10/486,928, filed Feb. 25, 2004, Shigeta et al.

* cited by examiner

*Primary Examiner*—Thomas G. Black
*Assistant Examiner*—Brian J Broadhead
(74) *Attorney, Agent, or Firm*—Oblon, Spivak, McClelland, Maier & Neustadt, P.C.

(57) ABSTRACT

A drive-force distribution controller controls a drive-force transmission apparatus of a vehicle in order to control transmission of drive force to rear wheels or front wheels of the vehicle in accordance with a designated drive-force transmission ratio. The drive-force transmission ratio is changed on the basis of vehicle speed, differential rotational speed (speed difference between the front and rear wheels), and throttle opening. Alternatively, the drive-force transmission ratio is changed on the basis of vehicle speed, throttle opening, and throttle open speed. The change speed of current which is supplied to the drive-force transmission apparatus in order to control the drive-force transmission ratio is adjusted in accordance with a command current filter value which is determined on the basis of vehicle speed and a command current filter map of a vehicle-speed responsive type.

28 Claims, 9 Drawing Sheets

Fig.8

| Vehicle Speed [km/h] | Throttle Opening [%] | | | | | |
|---|---|---|---|---|---|---|
| | 0 | 1 | 5 | 20 | 70 | 100 |
| 0 | 0 | 0 | 113 | 321 | 321 | 321 |
| 5 | 0 | 0 | 200 | 321 | 321 | 321 |
| 20 | 0 | 0 | 200 | 321 | 321 | 321 |
| 30 | 200 | 200 | 200 | 321 | 321 | 321 |
| 60 | 200 | 135 | 135 | 135 | 135 | 216 |
| 130 | 200 | 135 | 135 | 135 | 135 | 135 |
| 150 | 200 | 135 | 135 | 135 | 135 | 135 |

Low Speed Range L

Intermediate/High Speed Range H

Fig.9

| Vehicle Speed [km/h] | Throttle Open Speed [%/100ms] | | | | | |
|---|---|---|---|---|---|---|
| | 5 | 7 | 10 | 12 | 15 | 20 |
| 0 | 0 | 0 | 50 | 150 | 150 | 150 |
| 5 | 0 | 0 | 100 | 150 | 150 | 150 |
| 20 | 0 | 0 | 200 | 321 | 321 | 321 |
| 30 | 321 | 321 | 321 | 321 | 321 | 321 |
| 60 | 321 | 321 | 321 | 321 | 321 | 321 |
| 130 | 200 | 200 | 200 | 200 | 200 | 200 |
| 150 | 200 | 200 | 200 | 200 | 200 | 200 |

Low Speed Range L‡

Intermediate/High Speed Range H‡

DRIVE-FORCE DISTRIBUTION CONTROLLER AND DRIVE-FORCE DISTRIBUTION METHOD FOR FOUR-WHEEL-DRIVE VEHICLE

INCORPORATION BY REFERENCE

The present application claims priority under 35 U.S.C. §119 to Japanese Patent Applications No.2002-126960, filed on Apr. 26, 2002, No.2002-126220, filed on Apr. 26, 2002 and No.2002-126961, filed on Apr. 26, 2002. The contents of that applications are incorporated herein by reference to in their entirety.

BACKGROUND OF THE INVENTION

1. Field of the Invention

The present invention relates to a drive-force distribution controller and a drive-force distribution method for a four-wheel-drive vehicle.

2. Description of the Related Art

Conventionally, there has been known a drive-force distribution controller for a four-wheel-drive vehicle which variably controls the drive-force transmission ratio of a drive-force transmission apparatus in accordance with difference in rotational speed between front and rear wheels (differential rotational speed) and vehicle speed. Specifically, the drive-force distribution controller determines a drive force or torque corresponding to a differential rotational speed and a vehicle speed with reference to a differential-rotational-speed-to-torque map, and controls the engagement force of an electromagnetic clutch of the drive-force transmission apparatus so that the determined torque is transmitted to the front wheels or the rear wheels. The differential-rotational-speed-toque map defines a change in the torque with the differential rotational speed for each of a plurality of vehicle speed ranges in such a manner that the torque increases with the differential rotational speed. The differential-rotational-speed-to-torque map is previously determined on the basis of experiment data on a vehicle model and through well-known theoretical calculation.

The differential-rotational-speed-to-torque map has conventionally been determined in such a manner that a relatively large torque is transmitted to the front or rear wheels in order to cope with a situation, such as uphill climbing or starting, in which the throttle opening and differential rotational speed are greater than those in the case of ordinary straight travel. Therefore, during uphill climbing or starting in which the throttle opening increases and the differential rotational speed increases as compared with ordinary straight travel, the torque transmitted to the front or rear wheels is increased so as to obtain satisfactory uphill climbing performance or satisfactory starting performance.

However, the conventional drive-force distribution controller cannot properly control the torque transmitted to the front or rear wheels during cornering. Specifically, the differential-rotational-speed-to-torque map is also referred to when the amount by which the accelerator pedal is depressed (i.e., the throttle opening) is large during cornering in which the differential rotational speed increases as compared with ordinary travel; i.e., when the driver causes the vehicle to corner at excessively high speed. In such a state, if the torque value obtained from the differential-rotational-speed-to-torque map deviates from a proper range or intended range (i.e., the torque value becomes excessive large because of large differential rotational speed and high vehicle speed), the steering characteristics tend to shift to the under-steer side, and the entire vehicle body may be pushed outward from an intended cornering path.

Further, the differential-rotational-speed-to-torque map is also referred to when the depression amount of the accelerator pedal (i.e., the throttle opening) is reduced during cornering. In such a state, if the torque value obtained from the differential-rotational-speed-to-torque map deviates from a proper range or an intended range, the steering characteristics tend to shift to the over-steer side, and the rear of the vehicle may drift outward from an intended cornering path, for the following reason. Although the torque distributed to the rear wheels determined on the basis of the differential rotational speed increases as the vehicle speed decreases, if the vehicle speed decreases to a certain level, the torque is decreased sharply in order to avoid a so-called tight-corner braking phenomenon.

There has also been known a drive-force distribution controller for a four-wheel-drive vehicle which variably controls the drive-force transmission ratio of a drive-force transmission apparatus in accordance with vehicle speed and throttle opening so as to variably control the ratio of drive force distribution between the front and rear wheels Specifically, the drive-force distribution controller determines a drive force (transmission torque) corresponding to a vehicle speed and a throttle opening with reference to a predetermined torque map, and controls the engagement force of an electromagnetic clutch of the drive-force transmission apparatus in such a manner that the determined torque is transmitted to the front wheels or the rear wheels. The torque map is a table for determining the transmission torque, while the vehicle speed and the throttle opening are used as parameters, and is previously determined on the basis of experiment data on a vehicle model and through well known theoretical calculation.

However, the conventional drive-force distribution controller involves the following problems. In general, the above-described torque map is configured to provide a relatively large command torque in a low speed range. Therefore, in the case where the throttle opening increases abruptly in a low speed range, such as the case of abrupt starting, the command torque becomes excessively large, and in some cases, a driver feels a shock produced upon engagement operation of the electromagnetic clutch. Further, the torque map is configured to provide a relatively small command torque in intermediate and high speed ranges under the assumption that abrupt acceleration is hardly demanded and acceleration is effected mildly. Therefore, in the case where a driver feels that the torque is insufficient while traveling uphill, the driver must depress the accelerator pedal by a large extent in order to obtain satisfactory torque. Therefore, in some cases, the conventional drive-force distribution controller fails to effect drive force distribution in accordance with traveling conditions.

There has also been known a drive-force distribution controller which calculates a command torque (frictional engagement force of an electromagnetic clutch mechanism of the drive-force transmission apparatus) on the basis of vehicle speed, throttle opening, etc. and calculates a command current pass the electromagnetic clutch corresponding to the calculated command torque.

Further, the drive-force distribution controller filters the command current by use of a command-current filter value (time constant) that is set in accordance with a previously assumed vehicle control state (e.g., a normal control state during straight travel, or a tight-corner control state during travel along a tight curve. The drive-force distribution controller supplies the filtered command current to the electromagnetic coil of the electromagnetic clutch mechanism. The time that the current flowing through the electromagnetic coil (coil current) requires to reach the command current; i.e., the change speed of the coil current, is adjusted on the basis of the command-current filter value.

In this manner, the drive-force distribution controller optimally controls the transmission of torque between the front and rear wheels in accordance with traveling conditions of the vehicle by changing the frictional engagement force of the electromagnetic clutch mechanism in accordance with vehicle speed, throttle opening, etc.

However, the conventional drive-force distribution controller involves the following problems. Although the command current filter value is set in accordance with a previously assumed vehicle control state, the command current filter value is a constant value which is determined without consideration of vehicle speed and other conditions. Therefore, a constant command current filter value is used in all speed ranges (e.g., a low speed range, an intermediate speed range, and a high speed range). Accordingly, during low-speed travel, shock or noise may be generated upon engagement of the clutch, and the motion stability of the vehicle may be impaired. Further, during intermediate or high-speed travel, under-steer may become strong, or under-steer may occur suddenly, with the result that the steerability and stability of the vehicle may be impaired.

SUMMARY OF THE INVENTION

In view of the foregoing, an object of the present invention is to provide a drive-force distribution controller and drive-force distribution method for a four-wheel-drive vehicle, which can improve both steerablity and motion stability of a vehicle.

Another object of the present invention is to provide a drive-force distribution controller and drive-force distribution method for a four-wheel-drive vehicle, which enable appropriate drive force distribution to be performed in accordance with traveling conditions.

Still another object of the present invention is to provide a drive-force distribution controller and drive-force distribution method for a four-wheel-drive vehicle, which can improve the steerability and motion stability of a vehicle and can reduce shock and noise generated upon clutch engagement.

The present invention is directed to a drive-force distribution controller and method for a four-wheel-drive vehicle equipped with a drive-force transmission apparatus which transmits drive force to rear wheels or front wheels of the vehicle in accordance with a designated drive-force transmission ratio.

According to a first aspect of the present invention, vehicle speed, differential rotational speed (speed difference between the front wheels and the rear wheels of the vehicle), and throttle opening (opening of a throttle valve of an engine of the vehicle) are detected, and the drive-force transmission ratio of the drive-force transmission apparatus is changed on the basis of not only the detected vehicle speed and the detected differential rotational speed, but also the detected throttle opening.

Preferably, a plurality of different drive-force maps are provided for different vehicle speed ranges, each drive-force map defining a different relation between the differential rotational speed and drive force to be transmitted to the front wheels or rear wheels. In this case, one of the provided drive-force maps is selected in accordance with the throttle opening. A drive force to be transmitted to the front wheels or rear wheels is determined with reference to the selected drive-force map, and the drive-force transmission apparatus is controlled in such a manner that the determined drive force is transmitted to the front wheels or rear wheels.

Preferably, a throttle opening threshold is set in accordance with the vehicle speed. The detected throttle opening is compared with the set throttle opening threshold, and one of the drive-force maps is selected in accordance with the result of the comparison.

Preferably, the plurality of drive-force maps include a first drive-force map whose characteristics are determined while priority is placed on the steerability of the vehicle in such a manner that the drive force increases at a predetermined rate as the differential rotational speed increases, a second drive-force map whose characteristics are determined while priority is placed on motion stability of the vehicle in such a manner that the drive force increases with the differential rotational speed at a rate lower than that in the first drive-force map. When the detected throttle opening is not less than the throttle opening threshold, the first drive-force map is selected. When the detected throttle opening is less than the throttle opening threshold, the second drive-force map is selected.

More preferably, the plurality of drive-force maps includes a third drive-force map having characteristics falling between those of the first and second drive-force maps in terms of at least the rate of increase of the drive force to increase of the differential rotational speed; and a throttle opening threshold map for obtaining a throttle opening upper-limit threshold and a throttle opening lower-limit threshold in accordance with the vehicle speed is provided. The throttle opening upper-limit threshold and the throttle opening lower-limit threshold are set with reference to the throttle opening threshold map. When the detected throttle opening is not less than the throttle opening upper-limit threshold, the first drive-force map is selected. When the detected throttle opening is less than the throttle opening lower-limit threshold, the second drive-force map is selected. When the detected throttle opening is less than the throttle opening upper-limit threshold but not less than the throttle opening lower-limit threshold, the third drive-force map is selected.

According to a second aspect of the present invention, vehicle speed and throttle opening are detected, and throttle open speed (speed at which the throttle valve is opened) is calculated on the basis of the detected throttle opening The drive-force transmission ratio of the drive-force transmission apparatus is changed on the basis of not only the detected vehicle speed and the detected throttle opening, but also the calculated throttle open speed.

Preferably, first and second maps are employed. The first map is used to obtain a command torque from the vehicle speed and the throttle opening. The second map is used to obtain a command torque from the vehicle speed and the throttle open speed. One of the provided maps is selected in accordance with the throttle open speed. A drive force to be transmitted to the front wheels or rear wheels is determined with reference to the selected map, and the drive-force transmission apparatus is controlled in such a manner that the determined drive force is transmitted to the front wheels or rear wheels.

Preferably, values of the command torque for a low speed range in the second map are set smaller than values of the command torque for a low speed range in the first map, and values of the command torque for an intermediate-high speed range in the second map are set greater than values of the command torque for an intermediate-high speed range in the first map.

Preferably, the throttle open speed is compared with a previously set threshold, and one of the provided maps is selected in accordance with the result of the comparison.

According to a third aspect of the present invention, vehicle speed and throttle opening are detected. A command torque is calculated on the basis of the detected vehicle speed and the detected throttle opening, the command torque representing a torque to be distributed to the front wheels or the rear wheels. A command current to be supplied to the drive-force transmission apparatus is calculated on the basis of the calculated command torque. The drive-force transmission ratio of the drive-force transmission apparatus changes in accordance with the supplied current. A command current filter value is determined on the basis of the detected vehicle speed and a command current filter map for providing a command current filter value which changes in accordance with the vehicle speed, and the change speed of the command current is adjusted in accordance with the determined command current filter value.

Preferably, a plurality of command current filter maps having different characteristics are provided for different traveling states of the vehicle. A plurality of command current filter values are obtained on the basis of the vehicle speed and the command current filter maps, and one of the command current filter values is selected in accordance with the present traveling state of the vehicle.

Preferably, determination as to whether each of command current values obtained at predetermined control intervals increases or decreases from a previous value is performed, and one of the command current filter values is selected in accordance with the result of the determination.

More preferably, a control state of the vehicle is judged from a plurality of assumed control states at predetermined intervals, and one of the command current filter values is selected in accordance with the result of the judgment and the result of the determination as to whether each of command current values obtained at predetermined control intervals increases or decreases.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIG. 8 is a table showing a normal map used in the second embodiment;

FIG. 9 is a table showing an alternative map used in the second embodiment;

DESCRIPTION OF THE PREFERRED EMBODIMENTS

Embodiments of the present invention will be described with reference to the drawings.

First Embodiment

<Overall Structure>

Figure 1:
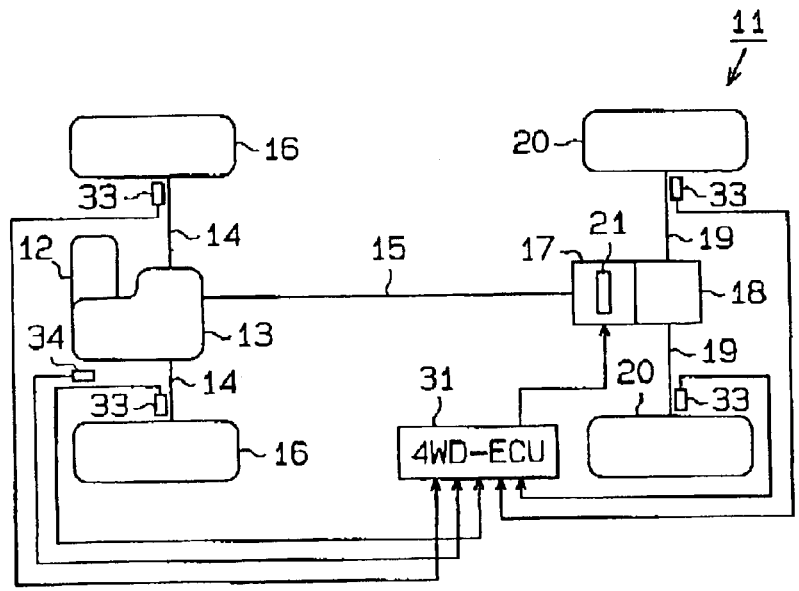
FIG. 1 is a diagram schematically showing the structure of a four-wheel-drive vehicle which is equipped with a drive-force distribution controller according to a first embodiment of the present invention.

As shown in FIG. 1, a four-wheel-drive vehicle 11 includes an internal combustion engine 12 and a transaxle 13. The transaxle 13 includes a transmission, a transfer, and other necessary components. A pair of front axles 14 and a drive shaft 15 are connected to the transaxle 13. Front wheels 16 are connected to the front axles 14. A drive-force transmission apparatus (coupling) 17 is connected to the drive shaft 15. A rear differential 18 is connected to the drive-force transmission apparatus 17 via an unillustrated drive-pinion shaft. Rear wheels 20 are connected to the rear differential 18 via a pair of rear axles 19.

Driving force or torque output from the engine 12 is transmitted to the front wheels 16 via the transaxle 13 and the front axles 14. When the drive shaft 15 and the drive pinion shaft are coupled to each other by means of the drive-force transmission apparatus 17, the torque output from the engine 12 is transmitted to the rear wheels 20 via the drive shaft 15, the drive-force transmission apparatus 17, the drive-pinion shaft, the rear differential 18, and the rear axles 19.

<Drive-Force Transmission Apparatus>

The drive-force transmission apparatus 17 includes a multiple-plate, wet-type electromagnetic clutch mechanism 21 having a plurality of clutch plates (not shown) which are caused to frictionally engage with one another and separate from one another. When current is supplied to an electromagnetic coil 22 (see FIG. 2) provided within the electromagnetic clutch mechanism 21, the clutch plates frictionally engage with one another in order to enable transmission of torque (drive force) between the front wheels 16 and the rear wheels 20. When supply of current to the electromagnetic coil 22 is stopped, the clutch plates separate from one another, whereby the transmission of torque (drive force) between the front wheels 16 and the rear wheels 20 is shut off The frictional engagement force of the clutch plates changes in accordance with the magnitude of current supplied to the electromagnetic coil 22. Through the control of the magnitude of current supplied to the electromagnetic coil 22, the transmission of torque between the front wheels 16 and the rear wheels 20; i.e., the force of constraint between the front wheels 16 and the rear wheels 20, can be adjusted freely. The torque transmitted between the front wheels 16 and the rear wheels 20 increases as the frictional engagement force of the clutch plates increases. By contrast, the torque transmitted between the front wheels 16 and the rear wheels 20 decreases as the frictional engagement force of the clutch plates decreases.

The supply, shut-off, and adjustment of current to the electromagnetic coil 22 is controlled by means of an electronic controller for drive-force distribution (hereinafter referred to as a "drive-force distribution controller") (4WD-ECU) 31. Specifically, by controlling the frictional engagement force of the clutch plates of the electromagnetic clutch mechanism 21, the drive-force distribution controller 31 selectively establishes a four-wheel-drive state or a two-wheel-drive state, and controls the drive-force distribution ratio (torque distribution ratio) between the front wheels 16 and the rear wheels 20 in the four-wheel-drive state.

<Electrical Configuration>

Next, the electrical configuration of the drive-force distribution controller 31 of the four-wheel-drive vehicle 11 will be described with reference to FIG. 2.

Figure 2:
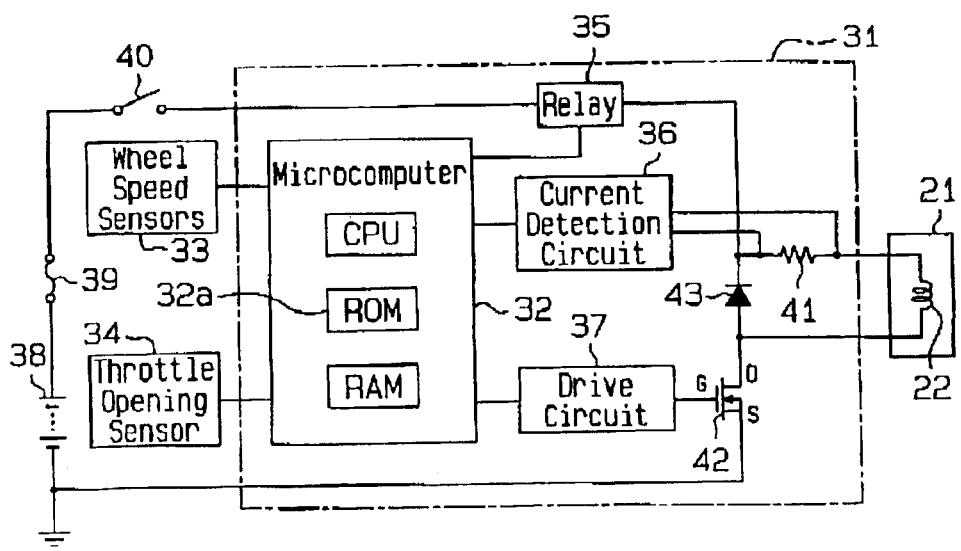
FIG. 2 is a circuit diagram showing the electrical configuration of the drive-force distribution controller according to the first embodiment.

As shown in FIG. 2, the drive-force distribution controller 31 of the four-wheel-drive vehicle 11 is mainly formed of a microcomputer 32 which includes a CPU (central processing unit), RAM (random access memory), ROM (read only memory) 32a, and input/output interfaces. The ROM 32a serves as storage means.

The ROM 32a stores various control programs to be executed by the microcomputer 32, various types of data, and various types of maps (conversion maps). The maps are previously obtained from experimental data on a vehicle model and through well-known theoretical calculation. The RAM serves as a data work area used by the CPU of the drive-force distribution controller 31 when the CPU performs various types of computation processing (e.g., computation processing for controlling supply of electricity to the electromagnetic coil 22) in accordance with the control programs stored in the ROM 32a.

Wheel speed sensors 33, a throttle opening sensor (throttle-opening detection means) 34, a relay 35, a current detection circuit 36, a drive circuit 37, and an engine controller (not shown) are connected to the microcomputer 32 via the unillustrated input/output interfaces.

The wheel speed sensors 33 are provided adjacent to the right and left front wheels 16 and the right and left rear wheels 20, respectively. The wheel speed sensors 33 (four in total) individually detect wheel speeds (revolutions per unit time or rotational speeds) of the right and left front wheels 16 and the right and left rear wheels 20, and send the detection results (wheel speed signals) to the microcomputer 32.

The throttle opening sensor 34 is connected to a throttle valve (not shown) in order to detect the opening degree of the throttle valve (throttle opening θ) or an amount by which a driver has depressed an accelerator pedal (not shown). The throttle opening sensor 34 sends the detection result (depressing amount signal) to the microcomputer 32.

The four-wheel-drive vehicle 11 includes a battery 38. A series circuit including a fuse 39, an ignition switch 40, the relay 35, a shunt resistor 41, the electromagnetic coil 22, and a field effect transistor (hereinafter referred to as the "FET") 42 is connected between two terminals of the battery 38.

The both ends of the shunt resistor 41 are connected to the input side of a current detection circuit 36. The current detection circuit 36 detects current that flows through the shunt resistor 41, on the basis of the voltage produced across the shunt resistor 41, and sends to the microcomputer 32 a signal indicating the detected current. The microcomputer 32 calculates the current flowing through the electromagnetic coil 22 on the basis of the signal output from the current detection circuit 36.

A flywheel diode 43 is connected to the both ends of the electromagnetic coil 22. The flywheel diode 43 absorbs counter electromotive force generated when the FET 42 is turned off, to thereby protect the FET 42. The gate G of the FET 42 is connected to the output side of the drive circuit 37. The line that connects the source S of the FET 42 and the negative terminal of the battery 38 is grounded.

When the ignition switch 40 is turned on (closed), electrical power is supplied from the battery 38 to the microcomputer 32 via a power supply circuit (not shown). As a result, the microcomputer 32 executes various control programs, such as a drive-force distribution control program, on the basis of various data (detection signals) obtained from the wheel speed sensors 33 and the throttle-opening sensor 34, to thereby calculate the magnitude of current (current command value) to be supplied to the electromagnetic coil 22.

The microcomputer 32 outputs the calculated current command value to the drive circuit 37. The drive circuit 37 turns the PET 42 on and off (PWM control) in such a manner that current corresponding to the current command value is supplied to the electromagnetic coil 22. In this manner, the microcomputer 32 variably controls the distribution of drive force to the front and rear wheels by controlling the magnitude of current supplied to the electromagnetic coil 22.

The supply of electrical power to the microcomputer 32 is stopped when the ignition switch 40 is turned off (opened).

<Operation of the First Embodiment>

Figure 3:
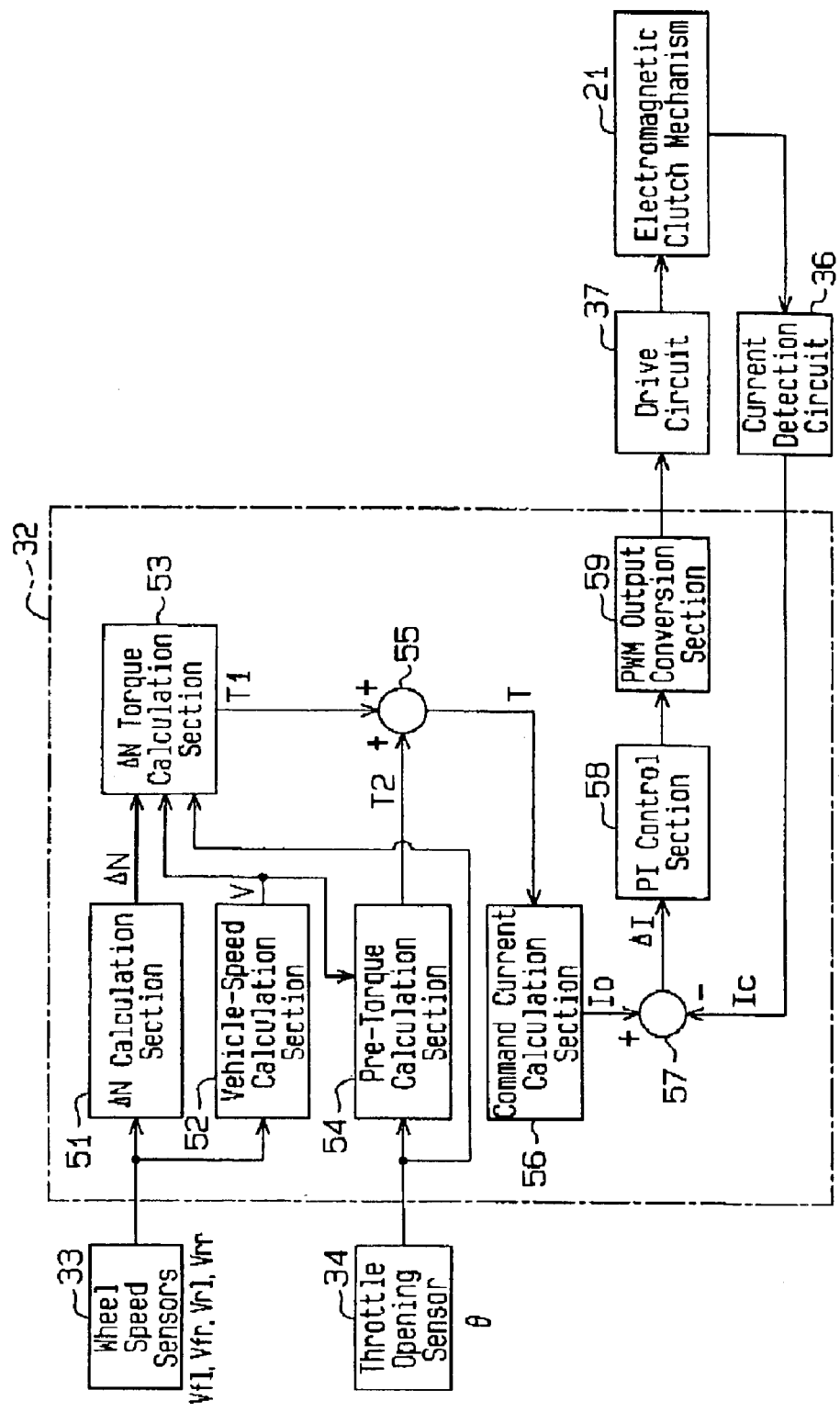
FIG. 3 is a functional block diagram of a microcomputer according to the first embodiment.

Next, various functions of the microcomputer 32 which are realized through execution of the various control programs stored in the ROM 32a will be described with reference to the functional block shown in FIG. 3. Notably, various parameters, such as wheel speeds Vfl, Vfr, Vrl, Vrr, throttle opening θ, and differential rotational speed ΔN, refer to corresponding signals.

The microcomputer 32 performs drive-force distribution control as follows. The wheel speeds Vfl, Vfr, Vrl, and Vrr of the left and right front wheels 16 and the left and right rear wheels 20 detected by the wheel speed sensors 33 are fed to a differential-rotational-speed calculation section (hereinafter referred to as the "ΔN calculation section") 51 and a vehicle-speed calculation section 52.

The vehicle-speed calculation section 52 calculates a vehicle speed V on the basis of the received wheel speeds Vfl, Vfr, Vrl, and Vrr. The vehicle-speed calculation section 52 feeds the calculated vehicle speed V to a differential-rotational-speed torque calculation section (hereinafter referred to as the "ΔN torque calculation section") 53 and a pre-torque calculation section 54. The vehicle-speed calculation section 52 serves as vehicle-speed detection means.

The ΔN calculation section 51 obtains a front-wheel average rotational speed Nfn(=(Vfl+Vfr)/2) on the basis of the wheel speeds Vfl and Vfr of the left and right front wheels 16, and a rear-wheel average rotational speed Nrn (=(Vrl+vrr)/2) on the basis of the wheel speeds Vrl and vrr of the left and right rear wheels 20. Further, the ΔN calculation section 51 calculates a differential rotational speed ΔN(=|Nfn−Nrn|) from the front-wheel average rotational speed Nfn and the rear-wheel average rotational speed Nrn. The ΔN calculation section 51 feeds the calculated differential rotational speed ΔN to the ΔN torque calculation section 53. The ΔN calculation section 51 serves as differential-rotational-speed detection means.

In addition to the vehicle speed V from the vehicle-speed calculation section 52 and the differential rotational speed ΔN from the ΔN calculation section 51, the throttle opening θ detected by the throttle opening sensor 34 is input to the ΔN torque calculation section 53. The ΔN torque calculation section 53 calculates a transmission torque corresponding to the vehicle speed V and the differential rotational speed ΔN (hereinafter referred to as "ΔN torque T1") with reference to a differential-rotational-speed-to-torque map (hereinafter referred to as the "ΔN torque map"). The ΔN torque map defines a change in the ΔN torque T1 with an increase in the differential rotational speed ΔN for each of a plurality of vehicle speed ranges. The ΔN torque calculation section 53 feeds the calculated ΔN torque T1 to an adder 55. The ΔN torque calculation section 53 serves as drive-force map selecting means and throttle opening threshold setting means.

The calculation of the ΔN torque T1 by the ΔN torque calculation section 53 will be described later.

In addition to the vehicle speed V from the vehicle-speed calculation section 52, the throttle opening θ detected by the throttle opening sensor 34 is input to the pre-torque calculation section 54. The pre-torque calculation section 54 calculates a transmission torque corresponding to the throttle opening θ and the vehicle speed V (hereinafter referred to as "pre-torque T2") with reference to a pre-torque map. The pre-torque map defines a change in the pre-torque T2 with an increase in the throttle opening θ for each of a plurality of vehicle speed ranges. The pre-torque calculation section 54 feeds the calculated pre-torque T2 to the adder 55.

The adder 55 adds the ΔN torque T1 fed from the ΔN torque calculation section 53 and the pre-torque T2 fed from the pre-torque calculation section 54 to thereby obtain a command torque T(=T1+T2). The adder 55 feeds the calculated command torque T to a command current calculation section 56.

The command current calculation section 56 calculates current corresponding to the command torque T fed from the adder 55 (hereinafter referred to as the "base command current I0") with reference to a base command current map. The base command current map is used to convert the command torque T to the base command current I0 and defines a change in the command torque T with a change in current supplied to the electromagnetic coil 22. The command current calculation section 56 corrects the base command current I0 in accordance with a correction coefficient corresponding to the vehicle speed V and feeds the corrected base command current I0 to a subtracter 57.

In addition to the base command current I0 from the command current calculation section 56, coil current Ic of the electromagnetic coil 22 detected by the current detection circuit 36 is input to the subtracter 57. The subtracter 57 feeds a current deviation ΔI(=|I0−Ic|) between the base command current I0 and the coil current Ic to a PI (proportional plus integral) control section 58. The PI control section 58 calculates a PI control value on the basis of the current deviation ΔI fed from the subtracter 57, and feeds the PI control value to a PWM (pulse width modulation) output conversion section 59.

The PWM output conversion section 59 performs PWM calculation in accordance with the received PI control value, and feeds the results of the PWM calculation to the drive circuit 37. The drive circuit 37 supplies coil current to the electromagnetic coil 22 of the electromagnetic clutch mechanism 21 on the basis of the results of the PWM calculation fed from the PWM output conversion section 59. The clutch plates of the electromagnetic clutch mechanism 21 frictionally engage with one another with an engagement force corresponding to the supplied coil current.

As described above, the microcomputer 32 optimally controls torque transmission between the front wheels 16 and the rear wheels 20 by variably controlling the base command current I0 in accordance with the differential rotational speed ΔN, the vehicle speed V, and the throttle opening θ (acceleration operation amount); i.e., in accordance with the traveling state of the vehicle.

<ΔN Torque Calculation Processing>

Next, the processing for calculating the ΔN torque T1 performed in the ΔN torque calculation section 53 of the microcomputer 32 will be described in detail with reference to the flowchart shown in FIG. 4. This calculation processing is performed through execution of the control programs stored in the ROM 32a. Notably, in the following description, step is represented by "S."

Figure 4:
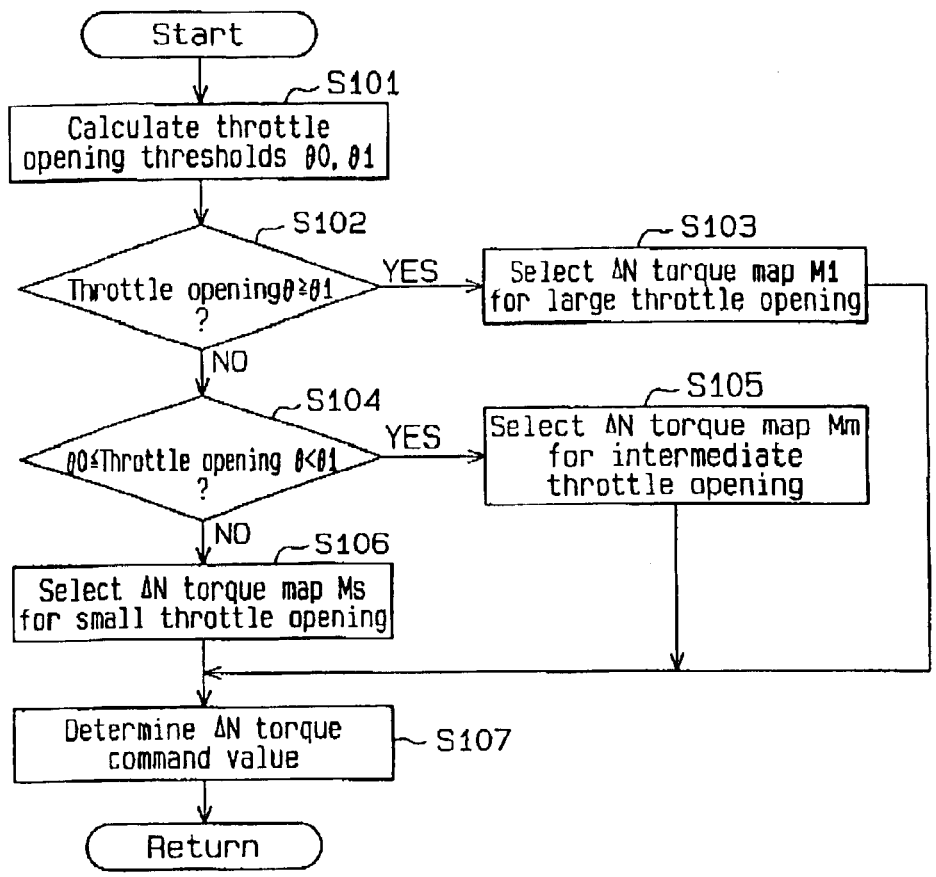
FIG. 4 is a flowchart showing the steps of determining differential-rotational-speed torque in the first embodiment.

As shown in FIG. 4, the ΔN torque calculation section 53 first calculates a throttle opening lower-limit threshold θ0 and a throttle opening upper-limit threshold θ1 on the basis of the vehicle speed V fed from the vehicle speed calculation section 52 (S101). At this time, the microcomputer 32 refers to a throttle opening threshold map Mk shown in FIG. 5.

Figure 5:
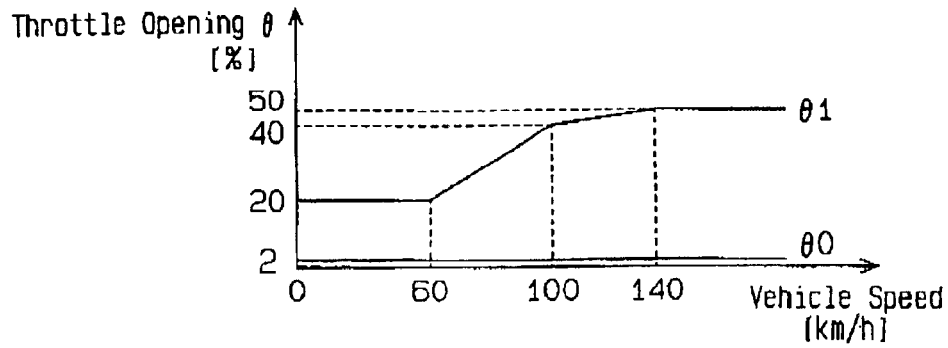
FIG. 5 is a graph showing a throttle opening threshold map used in the first embodiment to determine throttle opening thresholds from vehicle speed.

FIG. 5 shows the throttle opening threshold map Mk in the form of a graph wherein the horizontal axis represents vehicle speed V (km/h) and the vertical axis represents throttle opening θ (%). In the present embodiment, the throttle opening lower-limit threshold θ0 is defined to be 2% (constant) irrespective of vehicle speed V. The throttle opening upper-limit threshold θ1 is defined to be 20% (constant) when the vehicle speed V is 0 to 60 km/h (low speed range), to increase from 20 to 40% when the vehicle speed V is 60 to 100 km/h (intermediate speed range), to increase from 40 to 50% when the vehicle speed V is 100 to 140 km/h (high speed range), and to be 50% (constant) when the vehicle speed V is greater than 140 km/h (this range being included in the high speed range).

Subsequently, the ΔN torque calculation section 53 determines whether the throttle opening θ detected by the throttle opening sensor 34 is not less than the throttle opening upper-limit threshold θ1 obtained in S101 (S102).

Figure 6A:
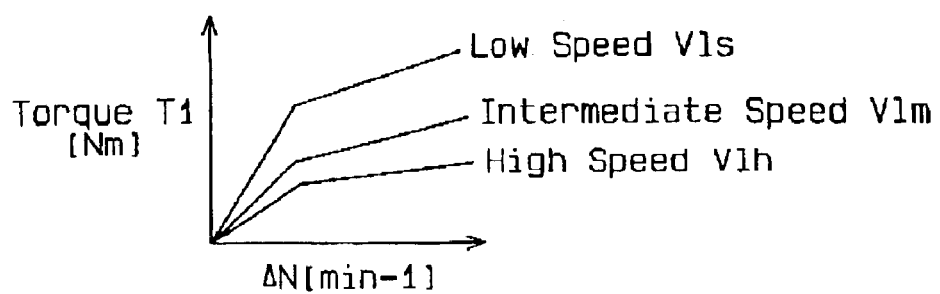
FIG. 6A is a ΔN-to-torque map for large throttle opening.

When the detected throttle opening θ is determined to be not less than the throttle opening upper-limit threshold θ1 (YES in S102), the ΔN torque calculation section 53 uses a ΔN torque map Ml for large throttle opening shown in FIG. 6A (S103), and calculates the ΔN torque T1 with reference to the ΔN torque map Ml (S107).

The ΔN torque map Ml for large throttle opening shown in FIG. 6A is used in the case where the throttle opening θ is large (i.e., a driver desires a large torque) and the differential rotational speed ΔN is large, such as at the time of uphill climbing or starting, or is used to improve the steerability in the case where the accelerator pedal is depressed by a large amount during cornering. The ΔN torque map Ml is previously stored in the ROM 32a.

The ΔN torque map Ml defines the relation between differential rotational speed ΔN (min$^{-1}$) (the horizontal axis in the graph shown in FIG. 6A) and ΔN torque T1 (Nm) (the vertical axis in the graph shown in FIG. 6A). The ΔN torque map Ml includes a map curve Vls to be used when the vehicle speed V is in a low speed range (0 to 60 km/h), a map curve Vlm to be used when the vehicle speed V is in an intermediate speed range (60 to 100 km/h), and a map curve Vlh to be used when the vehicle speed V is in a high speed range (100 km/h or higher).

Each of the map curves Vls, Vlm, and Vlh represents a change in the ΔN torque T1 with an increase in the differential rotational speed ΔN. The ratio of increase in the ΔN torque T1 to that in the differential rotational speed ΔN is set for each of the low, intermediate, and high speed ranges in such a manner that the ratio is the largest in the low speed range, decreases in the intermediate speed range, and decreases further in the high speed range. In other words, the map curve Vlm is located between the map curve Vls and the map curve Vlh.

The ΔN torque map Ml has the following characteristics. As shown by the map curves Vls, Vlm, and Vlh, as the differential rotational speed ΔN increases, the ΔN torque T1 increases sharply until the differential rotational speed ΔN reaches a predetermined value, and then increases gradually.

Therefore, in the case where the driver desires a large torque (the throttle opening θ is large) and the differential rotational speed ΔN becomes larger than that in the case of ordinary straight travel, such as at the time of uphill climbing or starting, sufficiently large ΔN torque T1 can be obtained through use of the ΔN torque map Ml, and thus a sufficiently large command torque T can be obtained, Therefore, intended uphill-climbing performance and starting performance are secured. Further, in the case where the accelerator pedal is depressed by a large amount during cornering, through use of the ΔN torque map Ml, the ΔN torque T1 is properly determined so as to prevent occurrence of a problems such that the steering characteristics shifts excessively to the under-steer side, or the entire vehicle body is pushed outward from an intended cornering path. Therefore, steerablity at the time of large throttle opening can be secured.

Meanwhile, when the detected throttle opening θ is determined to be less than the throttle opening upper-limit threshold θ1 (NO in S102), processing of the ΔN torque calculation section 53 proceeds to S104.

In S104, the ΔN torque calculation section 53 determines whether the throttle opening θ detected by the throttle opening sensor 34 is not less than the throttle opening lower-limit threshold θ0 and less than the throttle opening upper-limit threshold θ1.

Figure 6B:
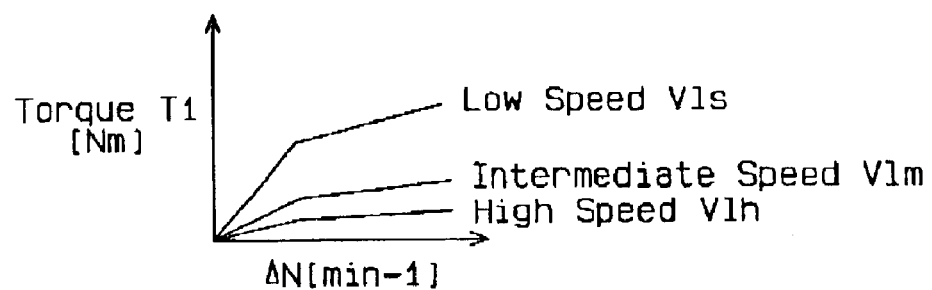
FIG. 6B is a ΔN-to-torque map for intermediate throttle opening.

When the detected throttle opening θ is determined to be not less than the throttle opening lower-limit threshold θ0 and less than the throttle opening upper-limit threshold θ1 (YES in S104), the ΔN torque calculation section 53 uses a ΔN torque map Mm for intermediate throttle opening shown in FIG. 6B (S105), and calculates the ΔN torque T1 with reference to the ΔN torque map Mm (S107).

The ΔN torque map Mm for intermediate throttle opening shown in FIG. 6B is used in the case of, for example, ordinary straight travel, in which there is not required a large ΔN torque T1 (engagement force) as is required in the case of uphill climbing or starting. The ΔN torque map Mm is previously stored in the ROM 32a. The ΔN torque map Mm for intermediate throttle opening has a configuration similar to that of the ΔN torque map Ml for large throttle opening. In the present embodiment, the ratio of increase in the ΔN torque T1 to that in the differential rotational speed ΔN in the ΔN torque map Mm is set to be smaller than that in the ΔN torque map Ml for large throttle opening.

In other words, the inclinations (the increase gradients of the ΔN torque T1) of the map curves Vls, Vlm, and Vlh of the ΔN torque map Mm for intermediate throttle opening are set slightly smaller than those of the map carves Vls, Vlm, and Vlh of the ΔN torque map Ml for large throttle opening.

Therefore, in the case of, for example, deceleration by braking or engine braking or ordinary straight travel, in which the driver desires smaller torque as compared with the cases of uphill climbing or starting, through use of the ΔN torque map Mm, control of torque transmission in accordance with the traveling state of the four-wheel-drive vehicle 11 is performed more finely. Therefore, sudden change of the motion of the vehicle is suppressed, and traveling stability is secured.

Figure 6C:
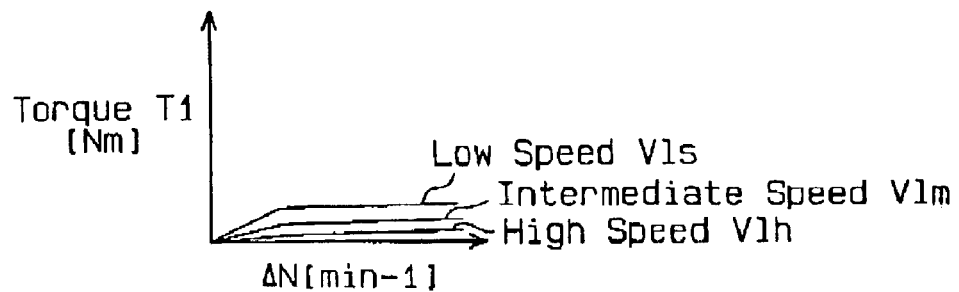
FIG. 6C is a ΔN-to-torque map for small throttle opening.

When the detected throttle opening θ is determined to be less than the throttle opening lower-limit threshold θ0 (NO in S104), the ΔN torque calculation section 53 uses a ΔN torque map Ms for small throttle opening shown in FIG. 6C (S106), and calculates the ΔN torque T1 with reference to the ΔN torque map Ms (S107).

The ΔN torque map Ms for small throttle opening shown in FIG. 6C is used in the case where the depression amount of the accelerator pedal decreases during cornering, and is previously stored in the ROM 32a. The ΔN torque map Ms has a configuration similar to that of the ΔN torque map Mm. In the present embodiment, the ratio of increase in the ΔN torque T1 to that in the differential rotational speed ΔN in the ΔN torque map Ms is set to be smaller than that in the ΔN torque map Mm for intermediate throttle opening.

In other words, the inclinations (the increase gradients of the ΔN torque T1) of the map curves Vls, Vlm, and Vlh of the ΔN torque map Ms for small throttle opening are set smaller than those of the map curves Vls, Vlm, and Vlh of the ΔN torque map Mm for intermediate throttle opening. The ΔN torque map Ms has the following characteristics. As shown by the map curves Vls, Vlm, and Vlh, as the differential rotational speed ΔN increases, the ΔN torque T1 increases slowly until the differential rotational speed ΔN reaches a predetermined value, and then is maintained substantially constant.

Therefore, in the case where the depression amount of the accelerator pedal decreases during cornering, through use of the ΔN torque map Ms, the ΔN torque T1 is determined properly in order to prevent unsatisfactory vehicle behavior such as occurrence of an excessive tack-in phenomenon in which the vehicle turns inward sharply or outward drift of the rear of the vehicle. Therefore, the motion stability of the vehicle at the time of small throttle opening is improved, and the traveling stability of the four-wheel-drive vehicle 11 is secured.

Subsequently, the microcomputer 32 repeats the processing steps S101 to S107 at predetermined control intervals.

As described above, the ΔN torque calculation section 53 selectively uses the ΔN torque maps Ml, Mm, and Ms in accordance with the traveling conditions of the four-wheel-drive vehicle 11 (e.g., a torque or acceleration that the driver desires and that can be determined on the basis of the throttle opening θ). Thus, the distribution of drive force to the front wheels and the rear wheels is controlled properly, and the stability and steerability of the four-wheel-drive vehicle 11 are secured.

Notably, the ΔN torque map Ml for large throttle opening serves as a first drive force map whose characteristics are determined while priority is placed on the steerability of the vehicle. The ΔN torque map Ms for small throttle opening serves as a second drive force map whose characteristics are determined while priority is placed on motion stability of the vehicle in such a manner that the gradient of increase of ΔN torque T1 (drive-force increase gradient) is smaller than that in the ΔN torque map Ml for large throttle opening. The ΔN torque map Mm for intermediate throttle opening serves as a third drive force map whose characteristics are determined in such a manner that the gradient of increase of ΔN torque T1 (drive-force increase gradient) falls between that in the ΔN torque map Ml for large throttle opening and that in the ΔN torque map Ms for small throttle opening.

<Effects of the First Embodiment>

According to the first embodiment, the following effects are provided (1) The drive-force transmission ratio of the drive-force transmission apparatus 17 is variably controlled on the basis of not only the vehicle speed V and the differential rotational speed ΔN, but also the throttle opening θ, whereby the distribution of drive force to the front wheels and the rear wheels is controlled variably. For example, the ΔN torque T1 is increased when both the differential rotational speed ΔN and the throttle opening θ are large; and the ΔN torque T1 is decreased if the throttle opening θ is small despite the differential rotational speed ΔN being large. Therefore, the ΔN torque T1, which determines the command torque T, can be set properly in accordance with the traveling conditions of the four-wheel-drive vehicle 11. Therefore, the steerability at the time of large throttle opening and the motion stability of the vehicle at the time of small throttle opening can be improved. Further, the steerability at the time of large throttle opening and the motion stability of the vehicle at the time of small throttle opening can be attained simultaneously.

(2) A plurality of ΔN torque maps Ml, Mm, and Ms, which differ from one another in terms of the relation between differential rotational speed ΔN and ΔN torque, are provided and selectively used in accordance with the throttle opening θ. Torque (transmission force) to be transmitted to the front wheels or rear wheels is determined with reference to a selected map; and the electromagnetic clutch mechanism 21 is controlled in such a manner that the thus-determined torque is transmitted to the front wheels or rear wheels. Therefore, the frictional engagement force of the electromagnetic clutch mechanism 21 can be controlled finely in accordance with the traveling conditions of the four-wheel-drive vehicle 11. Therefore, unlike the case in which only a single ΔN torque map is used, the ΔN torque T1 can be controlled finely in accordance with the traveling conditions of the four-wheel-drive vehicle 11, whereby both the traveling stability and steerability of the four-wheel-drive vehicle 11 can be improved.

(3) Throttle opening thresholds are set on the basis of the vehicle speed V, and the plurality of ΔN torque maps Ml, Mm, and Ms are selectively used on the basis of the results of comparison between the throttle opening threshold and the throttle opening θ. Specifically, a throttle opening upper-limit threshold θ1 and a throttle opening lower-limit threshold θ0 are set on the basis of the vehicle speed V and with reference to the throttle opening threshold map Mk; and when the throttle opening θ is not less than the throttle opening upper-limit threshold θ(θ1, the ΔN torque map Ml for large throttle opening is used. Similarly, when the throttle opening θ is less than the throttle opening upper-limit threshold θ1 but is not less than the throttle opening lower-limit threshold θ0, the ΔN torque map Mm for intermediate throttle opening is used; and when the throttle opening θ is less than the throttle opening lower-limit threshold θ0, the ΔN torque map Ms for small throttle opening is used. Accordingly, setting throttle opening thresholds in accordance with the vehicle speed V enables proper selection of a ΔN torque map in accordance with the throttle opening θ.

(4) A ΔN torque map Mm for intermediate throttle opening which has characteristics (i.e., the increase gradient of the ΔN torque T1) falling between those of the ΔN torque map Ml for large throttle opening and those of the ΔN torque map Ms for small throttle opening is provided. The provision of the ΔN torque map Mm suppresses abrupt changes in the ΔN torque T1, which would cause abrupt changes in the command torque T, which would otherwise occur when the ΔN torque map Ml for large throttle opening is switched to the ΔN torque map Ms for small throttle opening, or when the ΔN torque map Ms for small throttle opening is switched to the ΔN torque map Ml for large throttle opening. Therefore, the motion stability of the vehicle can be secured.

<Modifications>

The above-described first embodiment may be modified as follows.

In the first embodiment, the plurality of ΔN torque maps Ml, Mm, and Ms are selectively used. However, the ΔN torque map Mm for intermediate throttle opening may be omitted. In this case, only one throttle opening threshold is set. When the throttle opening θ is not less than the throttle opening threshold, the ΔN torque calculation section 53 uses the ΔN torque map Ml for large throttle opening. When the throttle opening θ is less than the throttle opening threshold, the ΔN torque calculation section 53 uses the ΔN torque map Ms for small throttle opening. In this case as well, unlike the case in which only a single ΔN torque map is used irrespective of the traveling conditions of the four-wheel dive vehicle 11, the steerability and motion stability of the four-wheel-drive vehicle 11 can be improved.

In the first embodiment, the first aspect of the present invention is applied to the four-wheel-drive vehicle 11, which is based on front-wheel drive. However, the first aspect of the present invention can be applied to a four-wheel-drive vehicle which is based on rear-wheel drive. In this case as well, effects identical with those described in (1) to (4) in relation to the first embodiment can be attained.

In the first embodiment, the command torque T is obtained through addition of the ΔN torque T1 to the pre-torque T2. However, the ΔN torque T1 may be used as the command torque T as is. That is, the pre-torque calculation section 54 may be omitted.

In the first embodiment, the ΔN torque maps Ml, Mm, and Ms are selectively used in accordance with the throttle opening θ detected by the throttle opening sensor 34. However, the ΔN torque maps Ml, Mm, and Ms may be selectively used in accordance with an amount of displacement of the accelerator pedal detected by an accelerator sensor (not shown) or the rotational speed of the engine 12 detected by an engine speed sensor (not shown).

In the first embodiment, the drive-force transmission apparatus 17 is equipped with the electromagnetic clutch mechanism 21. However, the drive-force transmission apparatus 17 may be equipped with a hydraulic clutch or any other suitable clutch mechanism.

In the first embodiment, the ΔN torque map Mm for intermediate throttle opening has characteristics falling between those of the ΔN torque map Ml for large throttle opening and those of the ΔN torque map Ms for small throttle opening. However, the ΔN torque map Mm for intermediate throttle opening is not necessarily required to have such intermediate characteristics. For example, the torque increase gradient of the ΔN torque map Mm for intermediate throttle opening may be set greater than that of the ΔN torque map Ml for large throttle opening or smaller than that of the ΔN torque map Ms for small throttle opening.

Second Embodiment

The overall structure of the four-wheel-drive vehicle, the structure of the drive-force transmission apparatus, and the electrical configuration are identical with those in the first embodiment, and therefore their repeated descriptions are omitted.

<Operation of the Second Embodiment>

Various functions of the microcomputer 32 which are realized through execution of the various control programs stored in the ROM 32a will be described with reference to the functional block diagram shown in FIG. 3. Notably, various parameters, such as wheel speeds Vfl, Vfr, Vrl, Vrr, throttle opening θ, and differential rotational speed ΔN, refer to corresponding signals.

The microcomputer 32 performs drive-force distribution control as follows. The wheel speeds Vfl, Vfr, Vrl, and Vrr of the left and right front wheels and the left and right rear wheels detected by the wheel speed sensors 33 are fed to a differential-rotational-speed calculation section (hereinafter referred to as the "ΔN calculation section") 51 and a vehicle-speed calculation section 52. On the basis of the received wheel speeds Vfl, Vfr, Vrl, and Vrr, the vehicle-speed calculation section 52 calculates a vehicle speed V. The vehicle-speed calculation section 52 feeds the calculated vehicle speed V to a differential-rotational-speed torque calculation section (hereinafter referred to as the "ΔN torque calculation section") 53 and a pre-torque calculation section 54. The vehicle-speed calculation section 52 serves as vehicle-speed detection means.

The ΔN calculation section 51 obtains a front-wheel average rotational speed Nfn (=(Vfl+Vfr)/2) on the basis of the wheel speeds Vfl and Vfr of the left and right front wheels 16, and a rear-wheel average rotational speed Nrn (=(Vrl+vrr)/2) on the basis of the wheel speeds Vrl and vrr of the left and right rear wheels 20. Further, the ΔN calculation section 51 calculates a differential rotational speed ΔN(=|Nfn−Nrn|) from the front-wheel average rotational speed Nfn and the rear-wheel average rotational speed Nrn. The ΔN calculation section 51 feeds the calculated differential rotational speed ΔN to the ΔN torque calculation section 53. The ΔN calculation section 51 serves as differential-rotational-speed detection means.

In addition to the vehicle speed V from the vehicle-speed calculation section 52 and the differential rotational speed ΔN from the ΔN calculation section 51, the throttle opening θ detected by the throttle opening sensor 34 is input to the ΔN torque calculation section 53. The ΔN torque calculation section 53 calculates a transmission torque corresponding to the vehicle speed V and the differential rotational speed ΔN (hereinafter referred to as "ΔN torque T1") with reference to a differential-rotational-speed-to-torque map (hereinafter referred to as the "ΔN torque map"). The ΔN torque map defines a change in the ΔN torque T1 with an increase in the differential rotational speed ΔN for each of a plurality of vehicle speed ranges. The ΔN torque calculation section 53 feeds the calculated ΔN torque T1 to an adder 55.

In addition to the vehicle speed V from the vehicle-speed calculation section 52, the throttle opening θ detected by the throttle opening sensor 34 is input to the pre-torque calculation section 54. The pre-torque calculation section 54 calculates a transmission torque corresponding to the throttle opening θ and the vehicle speed V (hereinafter referred to as "pre-torque T2") with reference to a pre-torque map. The pre-torque map defines a change in the pre-torque T2 with an increase in the throttle opening θ for each of a plurality of vehicle speed ranges. The pre-torque calculation section 54 feeds the calculated pre-torque T2 to the adder 55.

The calculation of the pre-torque T2 by the pre-torque calculation section 54 will be described later.

The adder 55 adds the ΔN torque fed from the ΔN torque calculation section 53 and the pre-torque T2 fed from the pre-torque calculation section 54 to thereby obtain a command torque T(=T1+T2). The adder 55 feeds the calculated command torque T to a command current calculation section 56.

The command current calculation section 56 calculates current corresponding to the command torque T fed from the adder 55 (hereinafter referred to as the "base command current I0") with reference to a base command current map. The base command current map is used to convert the command torque T to the base command current I0 and defines a change in the command torque T with a change in current supplied to the electromagnetic coil 22. The command current calculation section 56 corrects the base command current I0 in accordance with a correction coefficient corresponding to the vehicle speed V and feeds the corrected base command current I0 to a subtracter 57.

In addition to the base command current I0 from the command current calculation section 56, coil current Ic of the electromagnetic coil 22 detected by the current detection circuit 36 is input to the subtracter 57. The subtracter 57 feeds a current deviation ΔI(=|I0−Ic|) between the base command current I0 and the coil current Ic to a PI (proportional plus integral) control section 58. The PI control section 58 calculates a PI control value on the basis of the current deviation ΔI fed from the subtracter 57, and feeds the PI control value to a PWM (pulse width modulation) to an output conversion section 59.

The PWM output conversion section 59 performs PWM calculation in accordance with the received PI control value, and feeds the results of the PWM calculation to the drive circuit 37. On the basis of the results of the PWM calculation fed from the PWM output conversion section 59, the drive circuit 37 supplies current to the electromagnetic coil 22 of the electromagnetic clutch mechanism 21. The clutch plates of the electromagnetic clutch mechanism 21 frictionally engage with one another with an engagement force corresponding to the supplied coil current.

As described above, the microcomputer 32 optimally controls torque transmission between the front wheels 16 and the rear wheels 20 by variably controlling the base command current I0 in accordance with the differential rotational speed ΔN, the vehicle speed V, and the throttle opening θ (acceleration operation amount); i.e., in accordance with the traveling state of the vehicle.

<Pre-Torque Calculation Processing>

Next, the processing for calculating the pre-torque T2 performed in the pre-torque calculation section 54 of the microcomputer 32 will be described in detail with reference to the flowchart shown in FIG. 7. This calculation processing is performed through execution of the control programs stored in the ROM 32a.

Figure 7:
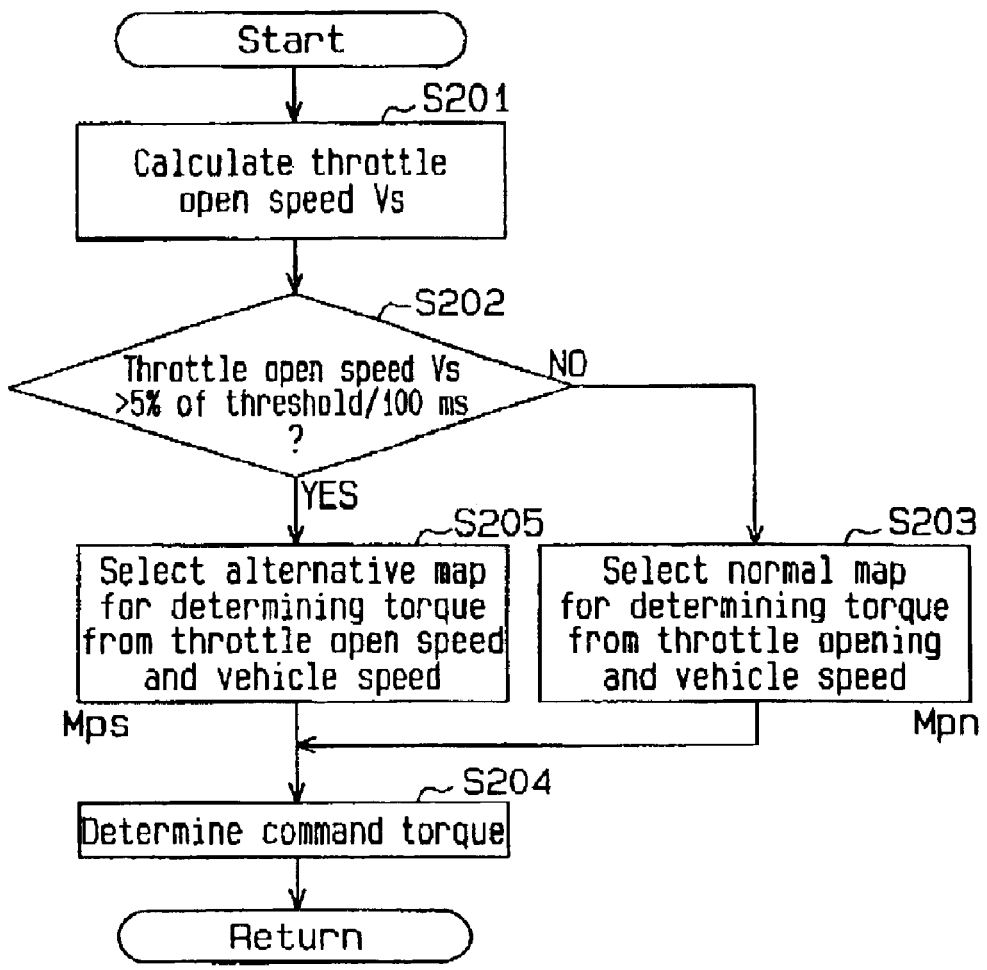
FIG. 7 is a flowchart showing the steps for calculating pre-torque in a second embodiment of the present invention.

As shown in FIG. 7, the pre-torque calculation section 54 of the microcomputer 32 calculates a throttle open speed Vs on the basis of the throttle opening θ sent from the throttle opening sensor 34 (S201). Specifically, the pre-torque calculation section 54 calculates a change in the throttle opening θ during each interval of 100 ms; i.e., a differential value of the throttle opening θ.

Subsequently, the pre-torque calculation section 54 determines whether the thus-calculated throttle open speed Vs is greater than a threshold Vs0 (5%/100 ms in the present embodiment) (S202).

When the throttle open speed Vs is determined to be not greater than the threshold Vs0 (NO in S202), the pre-torque calculation section 54 selects a pre-torque map configured to determine a command torque from the throttle opening θ and the vehicle speed V (hereinafter, this pre-torque map will be referred to as the "normal map Mpn") (S203), and then processing proceeds to S204.

In S204, the pre-torque calculation section 54 calculates the pre-torque T2 on the basis of the throttle opening θ and the vehicle speed V and with reference to the normal map Mpn.

The normal map Mpn is used for ordinary driving in which the driver does not depress the accelerator pedal abruptly as in the case of abrupt starting or acceleration while climbing uphill, and is previously stored in the ROM 32a.

As shown in FIG. 8, the normal map Mpn is a table for determining the pre-torque T2 from the throttle opening θ and the vehicle speed V. Specifically, a pre-torque (command torque) T2 is defined for each of combinations between different values (0, 1, 5, 20, 70, 100) of the throttle opening θ and different values (0, 5, 20, 30, 60, 130, 150) of the vehicle speed V. When the throttle opening θ and/or the vehicle speed V assumes a value falling between the different values, the pre-torque T2 is obtained through linear interpolation.

Meanwhile, when the pre-torque calculation section 54 determines in step S202 that throttle open speed Vs is greater than the threshold Vs0 (5%/100 ms) (YES in S202), the pre-torque calculation section 54 selects a pre-torque map configured to determine a command torque from the throttle open speed Vs and the vehicle speed V (hereinafter, this pre-torque map will be referred to as the "alternative map Mps") (S205), and processing proceeds to S204.

In S204, the pre-torque calculation section 54 calculates the pre-torque T2 on the basis of the throttle open speed Vs and the vehicle speed V and with reference to the alternative map Mps.

The alternative map Mps is used for the case in which the driver depresses the accelerator pedal abruptly at the time of, for example, abrupt starting or acceleration when climbing uphill, and is previously stored in the ROM 32a.

As shown in FIG 9, the alternative map Mps is a table for determining the pre-torque T2 from the throttle open speed Vs and the vehicle speed V. Specifically, a pre-torque (command torque) T2 is defined for each of combinations between different values (5, 7, 10, 12, 15, 20) of the throttle open speed Vs and different values (0, 5, 20, 30, 60, 130, 150) of the vehicle speed V. When the throttle open speed Vs and/or the vehicle speed V assumes a value falling between the different values, the pre-torque T2 is obtained through linear interpolation.

<Comparison between Alternative Map and Normal Map>

Values of command torque for a low speed range L* in the alternative map Mps (see FIG. 9) are set to be smaller than corresponding values of command torque for a low speed range L in the normal map Mpn (see FIG. 8). In the present embodiment, the values of command torque for the low speed range L* in the alternative map Mps are about half the corresponding values of command torque for the low speed range L in the normal map Mpn.

Values of command torque for an intermediate-high speed range H* in the alternative map Mps (see FIG. 9) are set to be greater than corresponding values of command torque for an intermediate-high speed range H in the normal map Mpn (see FIG. 8). In the present embodiment, the values of command torque for the intermediate-high speed range H* in the alternative map Mps are about 1.5 times the corresponding values of command torque for the intermediate-high speed range H in the normal map Mpn.

Here, the normal map Mpn shown in FIG. 8 is compared with the alternative map Mps shown in FIG. 9. Since the throttle opening θ is used as a parameter in the normal map Mpn, whereas the throttle open speed Vs is used as a parameter in the alternative map Mps, the comparison is performed as follows. First, a throttle open speed Vs is obtained from the normal map Mpn, and a command torque corresponding to the throttle open speed Vs is obtained. Subsequently, the thus-obtained command torque is compared with a command torque which is obtained from the alternative map Mps and which corresponds to the throttle open speed Vs.

<Low Speed Range>

First, values of command torque for the low speed range L in the normal map Mpn are compared with values of command torque for the low speed range L* in the alternative map Mps.

Here, for the normal map Mpn, there is considered a case where the throttle opening θ changes from 5% to 20% when the vehicle speed V=0 km/h.

The throttle open speed Vs (i.e., the differential value of the throttle opening θ) can be obtained by the following Expression (A).

$$Vs = d\theta/dt \quad (A)$$

where dθ represents variation in the throttle opening θ per unit time (control period), and dt represents a control period (sampling period).

In the present embodiment, since dθ=15% and dt=100 ms, through substitution of these values into Expression (A), the throttle open speed Vs can be obtained as follows.

Vs=15%/100 ms

Since a command torque corresponding to the thus-calculated throttle open speed Vs is a unit-time deviation dT of a corresponding command torque in the normal map Mpn, and the deviation dT is determined from the normal map Mpn as follows.

dT=208 Nm

This is the difference between the command torque corresponding to the combination of V=0 and θ=20% and the command torque corresponding to the combination of V=0 and θ=5% in the normal map Mpn.

In the alternative map Mps, the command torque corresponding to the combination of V=0 and Vs=15%/ms is 150 Nm, which is smaller than the command torque (208 Nm) corresponding to the combination of V=0 and Vs=15%/ms in the normal map Mpn.

From the above, it is understood that the values of command torque for the low speed range L* in the alternative map Mps are set smaller than the values of command torque for the low speed range L in the normal map Mpn.

<Intermediate-High Speed Range>

Next, values of command torque for the intermediate-high speed range H in the normal map Mpn are compared with values of command torque for the intermediate-high speed range H* in the alternative map Mps.

Here, for the normal map Mpn, there is considered a case where the throttle opening θ changes from 5% to 20% when the vehicle speed V=60 km/h. In this case, the throttle open speed Vs is calculated to be 15%/100 ms, and the command torque dT corresponding to the calculated throttle open speed Vs is 0 Nm.

In the alternative map Mps, the command torque corresponding to the combination of V=60 and Vs=15%/ms is 321 Nm, which is greater than the command torque (0 Nm) corresponding to the combination of V=60 and Vs=15/ms in the normal map Mpn.

From the above, it is understood that the values of command torque for the intermediate-high speed range H* in the alternative map Mps are set greater than the values of command torque for the intermediate-high speed range H in the normal map Mpn.

As described above, when the throttle open speed Vs is large in the state in which the speed of the vehicle falls in the low speed range; e.g., when the vehicle is started abruptly, the alternative map Mps is used, whereby the base command current I0 supplied to the electromagnetic clutch mechanism 21 (i.e., the torque transmitted to the rear wheels) decreases as compared with the case in which the normal map Mpn is used. Therefore, shock that is generated upon engagement of the clutch at the time of abrupt starting can be mitigated.

Further, when the vehicle travels uphill at a speed in the intermediate-high speed range; i.e., when the throttle open speed Vs is small in the intermediate-high speed range, the alternative map Mps is used, whereby the base command current I0 supplied to the electromagnetic clutch mechanism 21 (i.e., the torque transmitted to the rear wheels) increases as compared with the case in which the normal map Mpn is used. Therefore, when a driver desires a sensation of strong torque or stability in the state in which the vehicle travels uphill at a speed in the intermediate-high speed range, the driver can obtain a sensation of strong torque or stability by depressing the accelerator pedal by only a small amount.

Through the selective use of the normal map Mpn and the alternative map Mps in accordance with the traveling conditions of the four-wheel-drive vehicle 11 (in the present embodiment, the driver's intention for acceleration detected on the basis of the throttle open speed Vs), the distribution of drive force to the front wheels and the rear wheels is controlled properly.

Subsequently, the microcomputer 32 repeats the processing steps S201 to S205 at predetermined control intervals (sampling intervals). In the present embodiment, the control intervals are set to 100 ms.

<Effects of the Second Embodiment>

According to the second embodiment, the following effects are provided.

(1) The drive-force transmission ratio of the drive-force transmission apparatus 17 is variably controlled on the basis of not only the vehicle speed V and the throttle opening θ, but also the throttle open speed Vs, whereby the distribution of drive force to the front wheels and the rear wheels is controlled variably. For example, when an abrupt change in the throttle open speed Vs is detected, a proper command torque is set on the basis of the throttle open speed Vs and a vehicle speed V at that time. This prevents generation of shock, which would otherwise be generated upon engagement of the clutch attributed to excessively large torque, and an increase in the operation amount of the acceleration pedal, which would otherwise occur because of insufficient torque. Therefore, the distribution of drive force can be performed properly in accordance with the traveling conditions of the four-wheel-drive vehicle 11. Further, the motion stability of the vehicle can be improved.

(2) The normal map Mpn and the alternative map Mps are selectively used in accordance with the calculated throttle open speed Vs. Torque (transmission force) to be transmitted to the front wheels or rear wheels is determined with reference to a selected map; and the drive-force transmission apparatus 17 is controlled in such a manner that the thus-determined torque is transmitted to the front wheels or rear wheels. Therefore, the drive force or torque transmitted to the front wheels or rear wheels can be controlled finely in accordance with the traveling conditions of the four-wheel-drive vehicle 11, whereby the vehicle motion stability can be improved.

(3) The values of command torque for the low speed range L* in the alternative map Mps are set smaller than the values of command torque for the low speed range L in the normal map Mpn. Therefore, when the throttle opening θ increases abruptly in the low speed range; e.g., when the vehicle is started abruptly, through use of the alternative map Mps, the command torque can be decreased as compared with the case in which the normal map Mpn is used. Therefore, it is possible to mitigate shock that is generated as a result of excessively large torque upon engagement of the electromagnetic clutch mechanism 21 at the time of, for example, abrupt starting.

(4) The values of command torque for the intermediate-high speed range H* in the alternative map Mps are set greater than the values of command torque for the intermediate-high speed range H in the normal map Mpn. Therefore, when the vehicle travels uphill at a speed falling in the intermediate-high speed range, through use of the alternative map Mps, the driver can obtain a sensation of strong torque by depressing the accelerator pedal by only a small amount. In other words, the driver can obtain a sensation of strong torque without depressing the accelerator pedal by a large amount.

(5) The throttle open speed Vs is compared with a previously set threshold Vs0, and a map to be used is selected on the basis of the results of comparison. Since the threshold Vs0 corresponding to the throttle open speed Vs is set, a proper map corresponding to the throttle open speed Vs can be used.

<Modifications>

The above-described second embodiment may be modified as follows.

In the second embodiment, the values of command torque for the low speed range L* in the alternative map Mps are set smaller than the values of command torque for the low speed range L in the normal map Mpn; and the values of command torque for the intermediate-high speed range H* in the alternative map Mps are set greater than the values of command torque for the intermediate-high speed range H in the normal map Mpn. However, first and second alternative maps may be provided. The first alternative map is configured in such a manner that only the values of command torque for the low speed range L* are set smaller than the values of command torque for the low speed range L in the normal map Mpn. The second alternative map is configured in such a manner that only the values of command torque for the intermediate-high speed range H* are set greater than the values of command torque for the intermediate-high speed range H in the normal map Mpn. The normal map Mpn, the first alternative map, and the second alternative map are selectively used in accordance with the throttle open speed Vs. In this case as well, effects identical with those described in (1) to (5) in relation to the second embodiment can be attained.

The alternative map Mps may be replaced with the first alternative map. In this case, the normal map Mpn and the first alternative map are selectively used in accordance with the throttle open speed Vs. In this case as well, an effect identical with that described in (3) in relation to the second embodiment can be attained.

The alternative map Mps may be replaced with the second alternative map. In this case, the normal map Mpn and the second alternative map are selectively used in accordance with the throttle open speed Vs. In this case as well, an effect identical with that described in (4) in relation to the second embodiment can be attained.

In the second embodiment, the alternative map Mps is configured to obtain a command torque from the throttle open speed Vs and the vehicle speed V. However, the alternative map Mps may be configured to obtain a command torque from accelerator operating speed and the vehicle speed V. Further, alternative map Mps may be configured to obtain a command torque from the vehicle speed V and unit-time change of engine speed.

Third Embodiment

The overall structure of the four-wheel-drive vehicle, the structure of the drive-force transmission apparatus, and the electrical configuration are identical with those in the first embodiment, and therefore, their repeated descriptions are omitted.

<Operation of the Third Embodiment>

Figure 10:
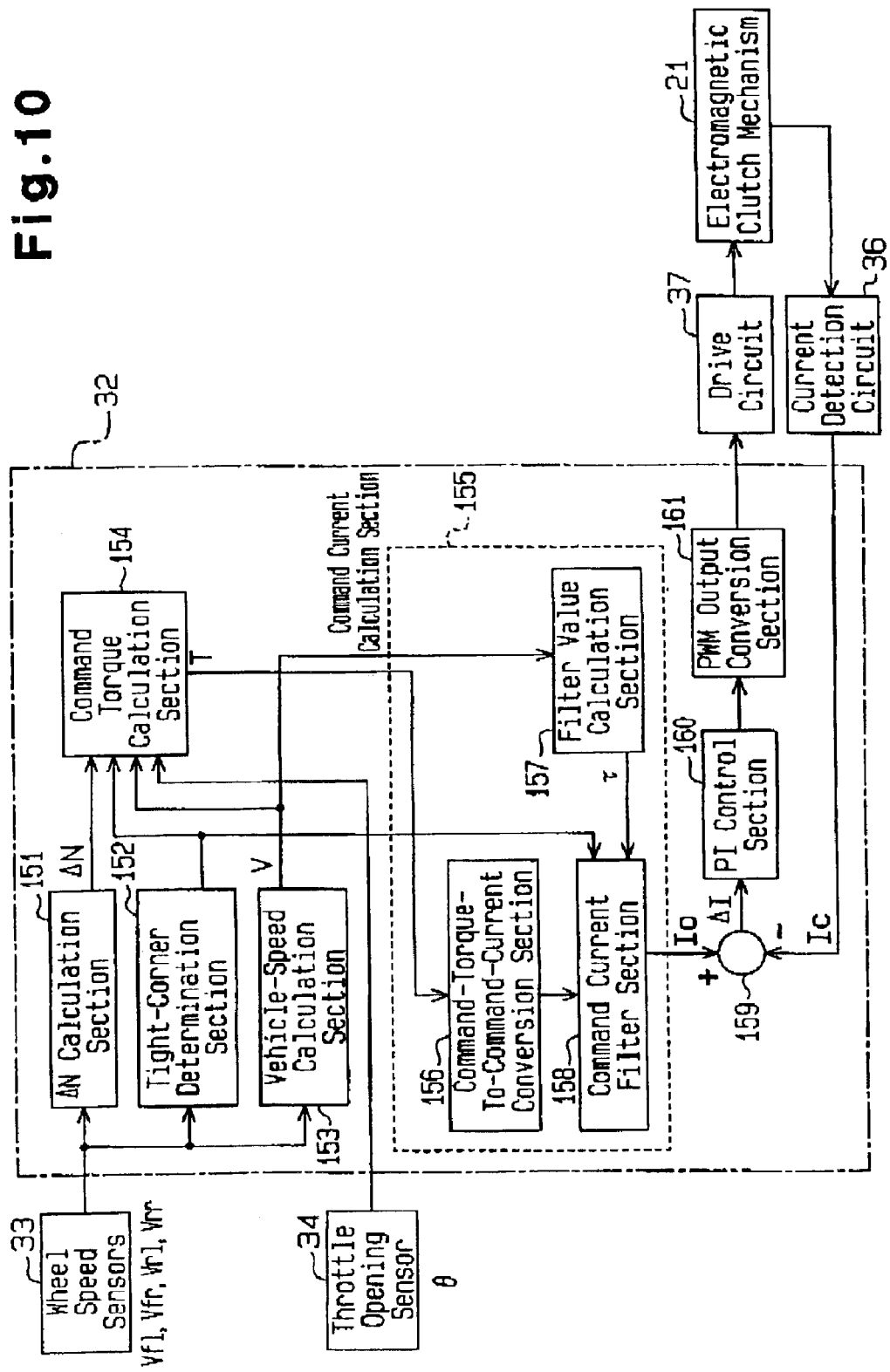
FIG. 10 is a functional block diagram of a microcomputer according to a third embodiment.

Next, various functions of the microcomputer 32 which are realized through execution of the various control programs stored in the ROM 32a will be described with reference to the functional block diagram shown in FIG. 10. Notably, various parameters, such as wheel speeds Vfl, Vfr, Vrl, Vrr, throttle opening θ, and differential rotational speed ΔN, refer to corresponding signals.

The microcomputer 32 performs drive-force distribution control as follows. The wheel speeds Vfl, Vfr, Vrl, and Vrr of the left and right front wheels 16 and the left and right rear wheels 20 detected by the wheel speed sensors 33 are fed to a differential-rotational-speed calculation section (hereinafter referred to as the "ΔN calculation section") 151, a tight-corner determination section 152, and a vehicle-speed calculation section 153.

The ΔN calculation section 151 obtains a front-wheel average rotational speed Nfn(=(Vfl+Vfr)/2) on the basis of the wheel speeds Vfl and Vfr of the left and right front wheels 16, and a rear-wheel average rotational speed Nrn (=(Vrl+vrr)/2) on the basis of the wheel speeds Vrl and vrr of the left and right rear wheels 20. Further, the ΔN calculation section 151 calculates a differential rotational speed ΔN(=|Nfn−Nrn|) from the front-wheel average rotational speed Nfn and the rear-wheel average rotational speed Nrn. The ΔN calculation section 151 feeds the calculated differential rotational speed ΔN to a command torque calculation section 154.

The tight corner determination section 152 determines whether the four-wheel-drive vehicle 11 is traveling along a tight corner, i.e., is in a tight-corner traveling state. Specifically, the tight corner determination section 152 calculates a rotational speed difference between the outside front wheel 16 and the inside rear wheel 20 on the basis of the wheel speeds Vfl, Vfr, Vrl, and Vrr output from the wheel speed sensors 33. When the calculated rotational speed difference is smaller than a previously set threshold, the tight corner determination section 152 judges that the vehicle 11 is in the tight-corner traveling state. When the calculated rotational speed difference is greater than the previously set threshold, the tight corner determination section 152 judges that the vehicle 11 is not in the tight-corner traveling state, but is in a normal traveling state. The threshold is determined as follows. A rotational speed difference which is produced between the outside front wheel and the inside rear wheel when the vehicle turns with a turning radius which causes a tight-corner braking phenomenon (a phenomenon in which braking torque acts on the drive wheels (the front wheels in the present embodiment) attributed to a difference in average turning radius between the front and rear wheels during cornering) is obtained through an experiment or theoretical calculation, and the threshold is determined on the basis of the thus-obtained rotational speed difference. The tight corner determination section 152 feeds the result of tight-corner determination to the command torque calculation section 154 and the command current calculation section 155.

The vehicle-speed calculation section 153, which serves as vehicle-speed detection means, calculates a vehicle speed V on the basis of the received wheel speeds Vfl, Vfr, Vrl, and Vrr. The vehicle-speed calculation section 153 feeds the calculated vehicle speed V to the command torque calculation section 154 and the command current calculation section 155.

In addition to the differential rotational speed ΔN from the ΔN calculation section 151, the result of tight-corner determination from the tight corner determination section 152, and the vehicle speed V from the vehicle-speed calculation section 153, the throttle opening θ detected by the throttle opening sensor 34 is input to the command torque calculation section 154.

The command torque calculation section 154, which serves as command torque calculation means, calculates transmission torque (ΔN torque) corresponding to the differential rotational speed ΔN, the result of tight-corner determination, and the vehicle speed V, with reference to a differential-rotational-speed-to-torque map (hereinafter referred to as the "ΔN torque map"). The ΔN torque map defines a change in the ΔN torque with an increase in the differential rotational speed ΔN for each of a plurality of vehicle speed ranges. For example, two types of ΔN torque maps; i.e., a ΔN torque map for normal travel and a ΔN torque map for tight-corner travel, are previously stored in the ROM 32a.

Further, the command torque calculation section 154 calculates a transmission torque (pre-torque) corresponding to the throttle opening θ and the vehicle speed V with reference to a pre-torque map. The pre-torque map defines a change in the pre-torque with an increase in the throttle opening θ for each of a plurality of vehicle speed ranges. For example, two types of pre-torque maps; i.e., a pre-torque map for normal travel and a pre-torque map for tight-corner travel, are previously stored in the ROM 32a.

The command torque calculation section 154 adds the ΔN torque to the calculated pre-torque to thereby obtain a command torque T, and feeds the thus-obtained command torque T to a command current calculation section 155, which serves as command current calculation means.

The command current calculation section 155 calculates a base command current I0 on the basis of the vehicle speed V from the vehicle-speed calculation section 153 and the command torque T from the command torque calculation section 154. Specifically, the command torque T from the command torque calculation section 154 is input to a command-torque-to-command-current conversion section 156; and the vehicle speed V from the vehicle-speed calculation section 153 is input to a filter value calculation section 157.

The command-torque-to-command-current conversion section 156 calculates current (base command current I0) corresponding to the command torque T from the command torque calculation section 154, with reference to a base command current map The base command current map is used to convert the command torque T to the base command current I0 and defines a change in the command torque T with a change in current supplied to the electromagnetic coil 22. The command-torque-to-command-current conversion section 156 feeds the calculated base command current I0 to a command current filter section 158.

The filter value calculation section 157 calculates a command current filter value τ corresponding to the vehicle speed V with reference to a command current filter map of a vehicle-speed response type. The command current filter map defines a change in the command current filter value τ

(time constant) with an increase in the vehicle speed V. A plurality of command current filter maps having different characteristics are stored in the ROM 32a. Each command current filter map is provided for an assumed vehicle traveling state. The filter value calculation section 157 calculates a plurality of command current filter values τ on the basis of the vehicle speed V with reference to the individual command current filter maps. The filter value calculation section 157 feeds the calculated command current filter values τ to the command current filter section 158.

In addition to the base command current I0 from the command-torque-to-command-current conversion section 156 and the command current filter values τ from the filter value calculation section 157, the result of tight-corner determination from the tight corner determination section 152 is input to the command current filter section 158. The command current filter section 158 selects one of the command current filter values τ on the basis of the a change (increase/decrease) in the base command current I0 and the result of tight-corner determination from the tight corner determination section 152 (i.e., the control state of the vehicle). Specifically, the command current filter section 158 selects an optimal command current filter value τ corresponding to the present traveling state. The command current filter section 158 filters the base command current I0 by use of the selected command current filter value τ, and feeds the filtered base command current I0 to a subtracter 159.

The calculation of command current by the command current calculation section 155 will be described later.

In addition to the base command current I0 from the command current calculation section 155 (more specifically, the command current filter section 158), coil current Ic current flowing through the electromagnetic coil 22) detected by the current detection circuit 36 is input to the subtracter 159. The subtracter 159 feeds a current deviation ΔI(=|I0−Ic|) between the base command current I0 and the coil current Ic to a PI (proportional plus integral) control section 160. The PI control section 160 calculates a PI control value on the basis of the current deviation ΔI fed from the subtracter 159, and feeds the PI control value to a PWM (pulse width modulation) output conversion section 161.

The PWM output conversion section 161 performs PWM calculation in accordance with the received PI control value, and feeds the results of the PWM calculation to the drive circuit 37. On the basis of the results of the PWM calculation fed from the PWM output conversion section 161, the drive circuit 37 supplies current to the electromagnetic coil 22 of the electromagnetic clutch mechanism 21. The clutch plates of the electromagnetic clutch mechanism 21 frictionally engage with one another with an engagement force corresponding to the supplied coil current.

As described above, the microcomputer 32 grasps the traveling state of the vehicle on the basis of the wheel speeds Vfl, Vfr, Vrl, and Vrr and the throttle opening θ, and variably controls the base command current I0 in accordance with the traveling state, to thereby optimally control torque transmission between the front wheels 16 and the rear wheels 20.

<Command Current Calculation Processing>

Next, the processing for calculating the base command current I0 performed in the command current calculation section 155 of the microcomputer 32 will be described in detail with reference to the flowchart shown in FIG. 11. This calculation processing is performed through execution of the control programs stored in the ROM 32a. In the present embodiment, a speed range of 0 to 30 km/h is called a low speed range, a speed range of 30 to 60 km/h is called an intermediate speed range, and a speed range of 60 km/h or greater is called a high speed range. Further, the term "normal control" refers to controls other than tight-corner control; i.e., controls which are performed when the vehicle travels along roads other than tight corners.

Figure 11:
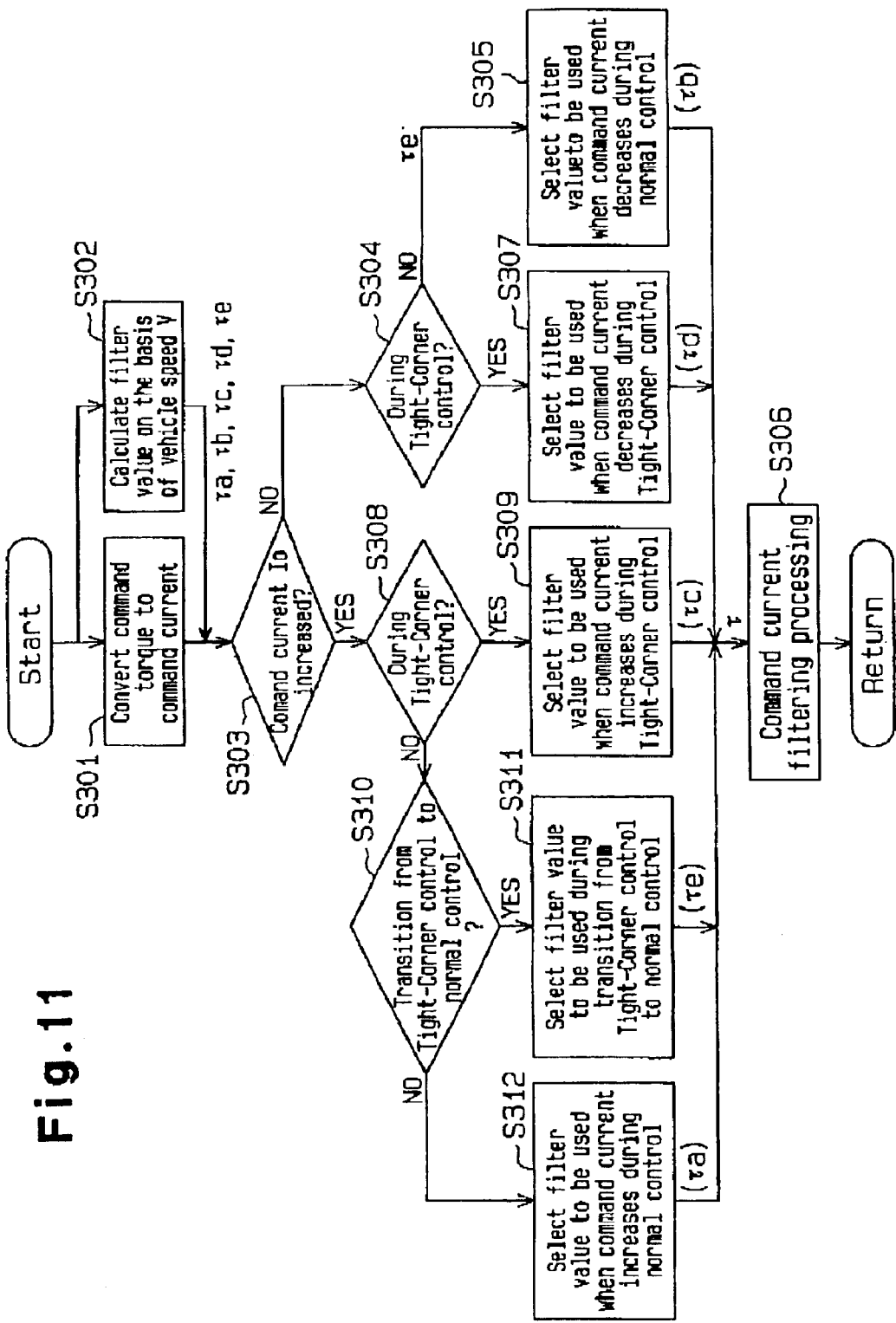
FIG. 11 is a flowchart showing the steps for calculating base-command current in the third embodiment of the present invention.

As shown in FIG. 11, the command-torque-to-command-current conversion section 156 of the command current calculation section 155 first calculates current (base command current I0) corresponding to the command torque T fed from the command torque calculation section 154, with reference to the base command current map (S301).

Simultaneously, the filter value calculation section 157 of the command current calculation section 155 calculates command current filter values τ on the basis of the vehicle speed V (S302).

Specifically, the filter value calculation section 157 calculates a command current filter value τ corresponding to the vehicle speed V with reference to each of command current filter maps Ma, Mb, Mc, Md, and Me of a vehicle-speed responsive type, which are previously stored in the ROM 32a and are shown in FIGS. 12A to 12E. In the present embodiments, the command current filter values τ calculated with reference to the command current filter maps Ma, Mb, Mc, Md, and Me are denoted by τa, τb, τc, τd, and τe, respectively. The calculated command current filter values τa, τb, τc, τd, and τe are fed the command current filter section 158.

The command current filter value τ is a time constant which represents the time by which the actual current (response) reaches 63.2% the command current (target value). The time required for the actual current (the coil current Ic in the present embodiment) to reach the command current (the base command current I0 in the present embodiment) is adjusted on the basis of the command current filter value τ; i.e., the time constant. The smaller the command current filter value τ, the higher the response; and the larger the command current filter value τ, the more slowly the command current changes.

In each of FIGS. 12A to 12E, which show command current filter maps Ma, Mb, Mc, Md, and Me, respectively, the horizontal axis represents vehicle speed V (km/h), and the vertical axis represents command current filter value τ (see). The command current filter maps Ma, Mb, Mc, Md, and Me define respective changes in the command current filter values τa, τb, τc, τd, and τe with an increase in the vehicle speed V.

Figure 12A:
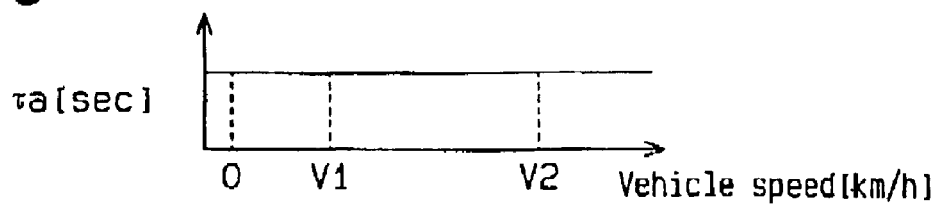
FIG. 12A is a graph showing a command current filter map used to obtain a command current filter value when command current increases during normal control.

The command current filter map Ma shown in FIG. 12A is used to obtain a command current filter value τa in the case where the base command current I0 tends to increase from the previous value during normal control. In the present embodiment, the command current filter map Ma has the following characteristics. The command current filter value τa is constant irrespective of the vehicle speed V. The command current filter value τa is set so as to attain response speed. Therefore, responsiveness (response speed) of the coil current Ic can be secured in the low, intermediate, and high speed ranges.

Figure 12B:
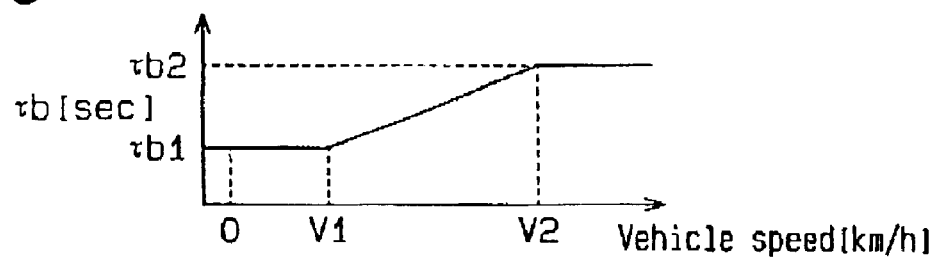
FIG. 12B is a graph showing a command current filter map used to obtain a command current filter value when command current decreases during normal control.

The command current filter map Mb shown in FIG. 12B is used to obtain a command current filter value τb in the case where the base command current I0 tends to decrease from the previous value during normal control. In the present embodiment, the command current filter map Mb has the following characteristics. The command current filter value τb is τb1 (constant) when the vehicle speed V is 0 to V1, increases from τb1 to τb2 when the vehicle speed V increases from V1 to V2, and is τb2 (constant) when the vehicle speed V is V2 or higher.

The τb1 is set to a value which enables obtainment of some degree of responsiveness without lowering the motion stability of the vehicle. τb2 is set while priority is placed on the motion stability of the vehicle, in such a manner that the command current does not change abruptly. Further, V1 is a speed in the low speed range, whereas V2 is a speed in the low speed range or the intermediate speed range. Therefore, use of the command current filter value τb suppresses abrupt change in the coil current Ic, which change would otherwise occur at the time of transition from the low speed range to the intermediate speed range.

Figure 12C:
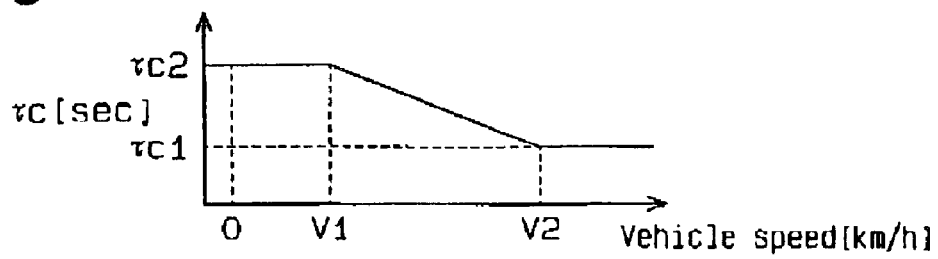
FIG. 12C is a graph showing a command current filter map used to obtain a command current filter value when command current increases during tight-corner control.

The command current filter map Mc shown in FIG. 12C is used to obtain a command current filter value τc in the case where the base command current I0 tends to increase from the previous value during tight-corner control. In the present embodiment the command current filter map Mc has the following characteristics. The command current filter value τc is τc2 (constant) when the vehicle speed V is 0 to V1, decreases from τc2 to τc1 when the vehicle speed V increases from V1 to V2, and is τc1 (constant) when the vehicle speed V is V2 or higher.

The τc1 is set to a value which enables obtainment of some degree of responsiveness without lowering the motion stability of the vehicle. τc2 is set to a value which prevents abrupt change in the command current and enables obtainment of some degree of responsiveness. Further, V1 is a speed in the low speed range, whereas V2 is a speed in the low speed range or the intermediate speed range. Therefore, when the command current filter value τc is used, in the low speed range, abrupt change in the coil current Ic is suppressed, and in the intermediate and high speed ranges, the responsiveness (response speed) of the coil current Ic can be secured to a degree such that the motion stability of the vehicle is not impaired.

Figure 12D:
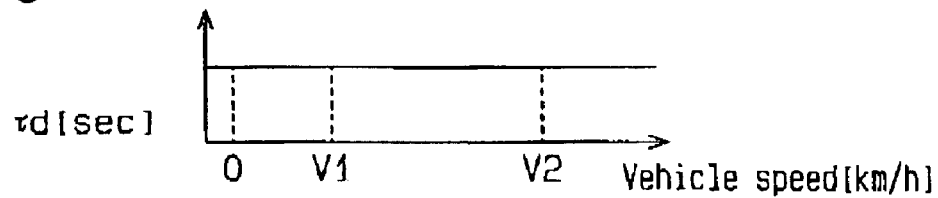
FIG. 12D is a graph showing a command current filter map used to obtain a command current filter value when command current decreases during tight-corner control.

The command current filter map Md shown in FIG. 12D is used to obtain a command current filter value τd in the case where the base command current I0 tends to decrease from the previous value during tight-corner control. In the present embodiment, the command current filter map Md has the following characteristics. The command current filter value τd is constant irrespective of the vehicle speed V. The command current filter value τd is set to a value which enables obtainment of some degree of responsiveness without lowering the motion stability of the vehicle. Therefore, when the command current filter value τd is used, in the low, intermediate, and high speed ranges, the responsiveness (response speed) of the coil current Ic can be secured to a degree such that the motion stability of the vehicle is not impaired.

Figure 12E:
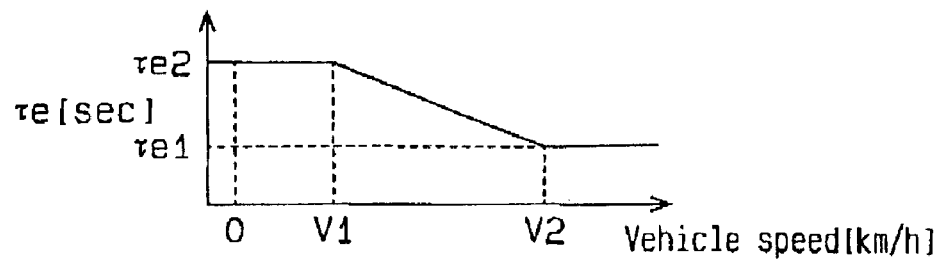
FIG. 12E is a graph showing a command current filter map used to obtain a command current filter value when command current increases during transition from tight-corner control to normal control.

The command current filter map Me shown in FIG. 12E is used to obtain a command current filter value τe in the case where the base command current I0 tends to increase from the previous value when tight-corner control is switched to normal control. In the present embodiment, the command current filter map Me has the following characteristics. The command current filter value τe is τe2 (constant) when the vehicle speed V is 0 to V1, decreases from τe2 to τe1 when the vehicle speed V increases from V1 to V2, and is τe1 (constant) when the vehicle speed V is V2 or higher.

τe1 is set to a value which enables obtainment of some degree of responsiveness without lowering the motion stability of the vehicle. τe2 is set to a value which prevents abrupt change in the command current and enables obtainment of some degree of responsiveness Further, V1 is a speed in the low speed range, whereas V2 is a speed in the low speed range or the intermediate speed range. Therefore, when the command current filter value τe is used, in the low speed range, abrupt change in the coil current Ic is suppressed, and in the intermediate and high speed ranges, the responsiveness (response speed) of the coil current Ic can be secured to a degree such that the motion stability of the vehicle is not impaired.

Upon completion of calculation of the command current filter value τa, τb, τc, τd, and τe, the command current filter section 158 of the command current calculation section 155 compares the base command current I0 obtained in S301 with the previous value (the previous base command current I0 after having undergone the filtering processing) (S303).

When the newly calculated base command current I0 is determined to be smaller than the previous value; i.e., when base command current I0 is determined to tend to decrease (NO in S303), processing of the command current filter section 158 proceeds to S304.

In S304, on the basis of the result of tight-corner determination output from the tight-corner determination section 152, the command current filter section 158 determines whether the tight-corner control is being performed.

When the tight-corner control is determined not to be performed (NO in S304), the command current filter section 158 selects the command current filter value τb obtained with reference to the command current filter map Mb and suitable for use when the command current tends to decrease during normal control (S305). Subsequently, processing of the command current filter section 158 proceeds to S306.

In S306, the command current filter section 158 filters the base command current I0 on the basis of the command current filter value τb. Through application of the command current filter value τb, in the low speed range, shock and noise generated upon engagement operation of the electromagnetic clutch mechanism 21 are suppressed, and in the intermediate and high speed ranges, the coil current Ic decreases slowly as compared with that in the low speed range, whereby the electromagnetic clutch mechanism 21 is operated smoothly. Further, during transition from the low speed range to the intermediate speed range, abrupt change (increase/decrease) in the coil current Ic is suppressed, whereby the motion stability of the vehicle is secured.

When the tight-corner control is determined to be performed (YES in S304), the command current filter section 158 selects the command current filter value τd obtained with reference to the command current filter map Md and suitable for use when the command current tends to decrease during tight-corner control (S307). Subsequently, processing of the command current filter section 158 proceeds to S306.

In S306, the command current filter section 158 filters the base command current I0 on the basis of the command current filter value τd. Through application of the command current filter value τd, in the low, intermediate, and high speed ranges, the responsiveness (response speed) of the coil current Ic is secured to some degree, and steerablity and the motion stability of the vehicle are secured.

When the newly calculated base command current I0 is determined to be greater than the previous value; i.e., when base command current I0 is determined to tend to increase (YES in S303), processing of the command current filter section 158 proceeds to S308.

In S308, the command current filter section 158 determines whether the tight-corner control is being performed.

When the tight-corner control is determined to be performed (YES in S308), the command current filter section 158 selects the command current filter value τc obtained with reference to the command current filter map Mc and suitable for use when the command current tends to increase during tight-corner control (S309). Subsequently, processing of the command current filter section 158 proceeds to S306.

In S306, the command current filter section 158 filters the base command current I0 on the basis of the command current filter value $\tau c$. Through application of the command current filter value $\tau c$, in the low speed range, shock and noise generated upon engagement operation of the electromagnetic clutch mechanism 21 are suppressed, and in the intermediate and high speed ranges, the responsiveness of the coil current Ic is enhanced to a degree such that the motion stability of the vehicle is not impaired. Further, during transition from the low speed range to the intermediate speed range, abrupt change in the coil current Ic is suppressed, whereby the motion stability of the vehicle is secured.

When the tight-corner control is determined not to be performed (NO in S308), processing of the command current filter section 158 proceeds to S310.

In S310, the command current filter section 158 determines whether switching from tight-corner control to normal control is being performed.

When the command current filter section 158 determines that switching from tight-corner control to normal control is being performed (YES in S310), the command current filter section 158 selects the command current filter value $\tau e$ obtained with reference to the command current filter map Me and suitable for use when the command current tends to increase during switching or transition from the tight-corner control to the normal control (S311). Subsequently, processing of the command current filter section 158 proceeds to S306.

In S306, the command current filter section 158 filters the base command current I0 on the basis of the command current filter value $\tau e$. Through application of the command current filter value $\tau e$, in the low speed range, shock and noise generated upon engagement operation of the electromagnetic clutch mechanism 21 are suppressed, and in the intermediate and high speed ranges, the responsiveness of the coil current Ic is enhanced to a degree such that the motion stability of the vehicle is not impaired. Further, during transition from the low speed range to the intermediate speed range, abrupt change in the coil current Ic is suppressed whereby the motion stability of the vehicle is secured.

When the command current filter section 158 determines that the switching from tight-corner control to normal control is not being performed (NO in S310), the command current filter section 158 selects the command current filter value $\tau a$ obtained with reference to the command current filter map Ma and suitable for use when the command current tends to increase during normal control (S312). Subsequently, the command current filter section 158 proceeds to S306.

In S306, the command current filter section 158 filters the base command current I0 on the basis of the command current filter value $\tau a$. Through application of the command current filter value $\tau a$, in the low, intermediate, and high speed ranges, high responsiveness (response speed) of the coil current Ic is secured.

<Effects of the Third Embodiment>

According to the third embodiment, the following effects are provided.

(1) The command current filter value $\tau$ to be used is determined on the basis of the vehicle speed V, and the time that the coil current Ic requires to reach the base command current I0 is adjusted in accordance with the command current filter value $\tau$. Unlike the case in which a constant command current filter value is used in all speed ranges, abrupt change of the coil current Ic is suppressed, whereby the motion stability of the vehicle can be improved. Further, shock and noise generated upon clutch engagement can be reduced.

(2) A plurality of command current filter values $\tau a$, $\tau b$, $\tau c$, $\tau d$, and $\tau e$ are previously obtained on the basis of the vehicle speed V and a plurality of command current filter maps Ma, Mb, Mc, Md, and Me having different characteristics. These command current filter values $\tau a$, $\tau b$, $\tau c$, $\tau d$, and $\tau e$ are selectively used in accordance with the current traveling state of the vehicle. Specifically, a determination is made as to whether the base command current I0 obtained at predetermined control intervals increases or decreases from the previous value, and a group of command current filter values for current increase or a group of command current filter values for current decrease is selected on the basis of the determination result. Subsequently, the control state of the vehicle is determined from a plurality of assumed control states; and on the basis of the determination result, a command current filter value $\tau$ to be used is selected from the group for current increase or the group for current decrease, whichever has been selected. Therefore, an optimal command current filter value $\tau$ can be selected in accordance with the traveling state of the vehicle.

In the present embodiment, the group for current increase includes the command current filter values $\tau a$, $\tau c$, and $\tau e$, whereas the group for current decrease includes the command current filter values $\tau b$ and $\tau d$. Further, the assumed control states include three control states; i.e., a normal control state, a tight-corner control state, and a state of transition from tight-corner control to normal control.

(3) Unlike the case in which a constant command current filter value is used in all speed ranges, use of a command current filter value $\tau$ that prevents generation of shock and noise caused by clutch engagement in the low speed range becomes possible, whereby the motion stability of the vehicle is improved. Further, in the intermediate and high speed ranges, the responsiveness (response speed) of the coil current Ic can be improved, while the motion stability of the vehicle is secured.

(4) A command current filter value $\tau$ to be used is obtained with reference to the command current filter maps Ma, Mb, Mc, Md, and Me. Therefore, tuning is easy. In the present embodiment, the term "tuning" refers to processing for obtaining a command current filter value to be used.

The third embodiment may be modified as follows.

In the third embodiment, the command current filter maps Mb, Mc, and Me are each configured to provide a command current filter value $\tau$ which linearly increases or decreases as the vehicle speed V increases. However, the characteristics of the command current filter maps Mb, Mc, and Me may be modified in such a manner that the command current filter value $\tau$ changes quadratically or exponentially as the vehicle speed V increases.

In the third embodiment, when a command current filter value $\tau$ is selected, a change in the base command current I0 is determined, and then an optimal command current filter value $\tau$ is selected in accordance with the control state of the vehicle. However, the optimal command current filter value $\tau$ may be selected in consideration of only the change in the base command current I0 or only the control state of the vehicle. In this case as well, the motion stability of the vehicle can be secured, unlike the case in which the command current filter value $\tau$ is fixed.

In the third embodiment, the tight-corner determination section 152 performs tight-corner determination on the basis of the wheel speeds Vfl, Vfr, Vrl, and Vrr output from the wheel speed sensors 33. However, the following method may alternatively be employed. A steering angle sensor (not shown) for detecting steering angle of the steering wheel is provided, and the tight-corner determination is performed on the basis of the steering angle detected by the steering angle sensor. In this case, when the detected steering angle is greater than a predetermined value, the vehicle is determined to travel along a tight corner.

Obviously, numerous modifications and variations of the present invention are possible in light of the above teachings. It is therefore to be understood that within the scope of the appended claims, the present invention may be practiced otherwise than as specifically described herein.

What is claimed is:

1. A drive-force distribution controller for a four-wheel-drive vehicle equipped with a drive-force transmission apparatus which transmits drive force to rear wheels or front wheels of the vehicle in accordance with a designated drive-force transmission ratio, comprising:

vehicle-speed detection means for detecting vehicle speed;

differential-rotational-speed detection means for detecting speed difference between the front wheels and the rear wheels of the vehicle as a differential rotational speed;

throttle-opening detection means for detecting opening of a throttle valve of an engine of the vehicle, wherein the drive-force distribution controller changes the drive-force transmission ratio of the drive-force transmission apparatus on the basis of not only the detected vehicle speed and the detected differential rotational speed, but also the detected throttle opening; and throttle opening threshold setting means for setting a throttle opening threshold in accordance with the vehicle speed.

2. A drive-force distribution controller according to claim 1, further comprising:

storage means for storing a plurality of different drive-force maps for different vehicle speed ranges, each drive-force map defining a different relation between the differential rotational speed and drive force to be transmitted to the front wheels or rear wheels; and drive-force map selecting means for selecting a drive-force map from the drive-force maps stored in the storage means in accordance with the throttle opening, wherein the drive-force distribution controller determines a drive force to be transmitted to the front wheels or rear wheels with reference to the drive-force map selected by the drive-force map selecting means, and controls the drive-force transmission apparatus in such a manner that the determined drive force is transmitted to the front wheels or rear wheels.

3. A drive-force distribution controller according to claim 2, wherein the drive-force map selecting means compares the detected throttle opening and the throttle opening threshold set by the throttle opening threshold setting means, and selects one of the stored drive-force maps in accordance with the result of the comparison.

4. A drive-force distribution controller according to claim 3, wherein the plurality of drive-force maps include a first drive-force map whose characteristics are determined while priority is placed on the steerability of the vehicle in such a manner that the drive force increases at a predetermined rate as the differential rotational speed increases, a second drive-force map whose characteristics are determined while priority is placed on motion stability of the vehicle in such a manner that the drive force increases with the differential rotational speed at a rate lower than that in the first drive-force map, wherein when the detected throttle opening is not loss than the throttle opening threshold set by the throttle opening threshold setting means, the map selecting means selects the first drive-force map, and when the detected throttle opening is less than the throttle opening threshold, the map selecting means selects the second drive-force map.

5. A drive-force distribution controller according to claim 4, wherein the plurality of drive-force maps includes a third drive-force map having characteristics falling between those of the first and second drive-force maps in terms of at least the rate of increase of the drive force to increase of the differential rotational speed;

the storage means stores a throttle opening threshold map for obtaining a throttle opening upper-limit threshold and a throttle opening lower-limit threshold in accordance with the vehicle speed; and the throttle opening threshold setting means sets the throttle opening upper-limit threshold and the throttle opening lower-limit threshold with reference to the throttle opening threshold map, wherein when the detected throttle opening is not less than the throttle opening upper-limit threshold, the map selecting means selects the first drive-force map;

when the detected throttle opening is less than the throttle opening lower-limit threshold, the map selecting means selects the second drive-force map; and when the detected throttle opening is less than the throttle opening upper-limit threshold but not less than the throttle opening lower-limit threshold, the map selecting means selects the third drive-force map.

6. A drive-force distribution method for a four-wheel-drive vehicle equipped with a drive-force transmission apparatus which transmits drive force to rear wheels or front wheels of the vehicle in accordance with a designated drive-force transmission ratio, comprising:

detecting vehicle speed, differential rotational speed which represents speed difference between the front wheels and the rear wheels of the vehicle, and opening of a throttle valve of an engine of the vehicle;

setting a throttle opening threshold in accordance with the vehicle speed; and changing the drive-force transmission ratio of the drive-force transmission apparatus on the basis of not only the detected vehicle speed and the detected differential rotational speed, but also the detected throttle opening.

7. A drive-force distribution method according to claim 6, further comprising:

providing a plurality of different drive-force maps for different vehicle speed ranges, each drive-force map defining a different relation between the differential rotational speed and drive force to be transmitted to the front wheels or rear wheels; and selecting a drive-force map from the provided drive-force maps in accordance with the throttle opening, wherein the step of changing the drive-force transmission ratio includes determining a drive force to be transmitted to the front wheels or rear wheels with reference to the selected drive-force map, and controlling the drive-force transmission apparatus in such a manner that the determined drive force is transmitted to the front wheels or rear wheels.

8. A drive-force distribution method according to claim 7, wherein said step of selecting a drive-force map comprises comparing the detected throttle opening and the throttle opening threshold, and selecting one of the drive-force maps in accordance with the result of the comparison.

9. A drive-force distribution method according to claim 8, wherein the plurality of drive-force maps include a first drive-force map whose characteristics are determined while priority is placed on the steerability of the vehicle in such a manner that the drive force increases at a predetermined rate as the differential rotational speed increases, a second drive-force map whose characteristics are determined while priority is placed on motion stability of the vehicle in such a manner that the drive force increases with the differential rotational speed at a rate lower than that in the first drive-force map, wherein when the detected throttle opening is not less than the throttle opening threshold, the first drive-force map is selected, and when the detected throttle opening is less than the throttle opening threshold, the second drive-force map is selected.

10. A drive-force distribution method according to claim 9, wherein the plurality of drive-force maps includes a third drive-force map having characteristics falling between those of the first and second drive-force maps in terms of at least the rate of increase of the drive force to increase of the differential rotational speed;

a throttle opening threshold map for obtaining a throttle opening upper-limit threshold and a throttle opening lower-limit threshold in accordance with the vehicle speed is provided; and the step of setting a throttle opening threshold comprises setting the throttle opening upper-limit threshold and the throttle opening lower-limit threshold with reference to the throttle opening threshold map, wherein when the detected throttle opening is not less than the throttle opening upper-limit threshold, the first drive-force map is selected;

when the detected throttle opening is less than the throttle opening lower-limit threshold, the second drive-force map is selected; and when the detected throttle opening is less than the throttle opening upper-limit threshold but not less than the throttle opening lower-limit threshold, the third drive-force map is selected.

11. A drive-force distribution controller for a four-wheel-drive vehicle equipped with a drive-force transmission apparatus which transmits drive force to rear wheels or front wheels of the vehicle in accordance with a designated drive-force transmission ratio, comprising:

vehicle-speed detection means for detecting vehicle speed;

throttle-opening detection means for detecting opening of a throttle valve of an engine of the vehicle; and throttle-open-speed calculation means for calculating throttle open speed on the basis of the throttle opening detected by the throttle-opening detection means, wherein the drive-force distribution controller changes the drive-force transmission ratio of the drive-force transmission apparatus on the basis of not only the detected vehicle speed and the detected throttle opening, but also the calculated throttle open speed.

12. A drive-force distribution controller according to claim 11, further comprising:

storage means for storing a first map to be used to obtain a command torque from the vehicle speed and the throttle opening and a second map to be used to obtain a command torque from the vehicle speed and the throttle open speed; and map selecting means for selecting one of the stored maps in accordance with the throttle open speed, wherein the drive-force distribution controller determines a drive force to be transmitted to the front wheels or rear wheels with reference to the map selected by the map selecting means, and controls the drive-force transmission apparatus in such a manner that the determined drive force is transmitted to the front wheels or rear wheels.

13. A drive-force distribution controller according to claim 12, wherein values of the command torque for a low speed range in the second map are set smaller than values of the command torque for a low speed range in the first map.

14. A drive-force distribution controller according to claim 13, wherein values of the command torque for an intermediate-high speed range in the second map are set greater than values of the command torque for an intermediate-high speed range in the first map.

15. A drive-force distribution controller according to claim 12, wherein the drive-force map selecting means compares the throttle open speed and a previously set threshold, and selects one of the stored maps in accordance with the result of the comparison.

16. A drive-force distribution method for a four-wheel-drive vehicle equipped with a drive-force transmission apparatus which transmits drive force to rear wheels or front wheels of the vehicle in accordance with a designated drive-force transmission ratio, comprising:

detecting vehicle speed and opening of a throttle valve of an engine of the vehicle;

calculating throttle open speed on the basis of the detected throttle opening; and changing the drive-force transmission ratio of the drive-force transmission apparatus on the basis of not only the detected vehicle speed and the detected throttle opening, but also the calculated throttle open speed.

17. A drive-force distribution method according to claim 16, further comprising:

providing a first map to be used to obtain a command torque from the vehicle speed and the throttle opening and a second map to be used to obtain a command torque from the vehicle speed and the throttle open speed; and selecting one of the provided maps in accordance with the throttle open speed, wherein the step of changing the drive-force transmission ratio comprises determining a drive force to be transmitted to the front wheels or rear wheels with reference to the selected map, and controlling the drive-force transmission apparatus in such a manner that the determined drive force is transmitted to the front wheels or rear wheels.

18. A drive-force distribution method according to claim 17, wherein values of the command torque for a low speed range in the second map are set smaller than values of the command torque for a low speed range in the first map.

19. A drive-force distribution method according to claim 18, wherein values of the command torque for an intermediate-high speed range in the second map are set greater than values of the command torque for an intermediate-high speed range in the first map.

20. A drive-force distribution method according to claim 17, wherein the step of selecting a drive-force map comprises comparing the throttle open speed and a previously set threshold, and selecting one of the provided maps in accordance with the result of the comparison.

21. A drive-force distribution controller for a four-wheel-drive vehicle equipped with a drive-force transmission apparatus which transmits drive force to rear wheels or front wheels of the vehicle in accordance with a designated drive-force transmission ratio, comprising:

vehicle-speed detection means for detecting vehicle speed;

throttle-opening detection means for detecting opening of a throttle valve of an engine of the vehicle;

command torque calculation means for calculating a command torque on the basis of the vehicle speed detected by the vehicle-speed detection means and the throttle opening detected by the throttle-opening detection means, the command torque representing a torque to be distributed to the front wheels or the rear wheels; and command current calculation means for calculating a command current to he supplied to the drive-force transmission apparatus, on the basis of the command torque calculated by the command torque calculation means, the drive-force distribution controller supplying the command current to the drive-force transmission apparatus in order to variably control the drive-force transmission ratio of the drive-force transmission apparatus, wherein the command current calculation means determines a command current filter value on the basis of the vehicle speed detected by the vehicle-speed detection means and a command current filter map stored in storage means and providing a command current filter value which changes in accordance with the vehicle speed, and adjusts the change speed of the command current in accordance with the determined command current filter value.

22. A drive-force distribution controller according to claim 21, wherein the storage means stores a plurality of command current filter maps provided for different traveling states of the vehicle, and having different characteristics; and the command current calculation means obtains a plurality of command current filter values on the basis of the vehicle speed and the command current filter maps, and selects one of the command current filter values in accordance with the present traveling state of the vehicle.

23. A drive-force distribution controller according to claim 22, wherein the command current calculation means determines whether each of command current values obtained at predetermined control intervals increases or decreases from a previous value, and selects one of the command current filter values in accordance with the result of the determination.

24. A drive-force distribution controller according to claim 23, wherein the command current calculation means judges a control state of the vehicle from a plurality of assumed control states at predetermined intervals, and selects one of the command current filter values in accordance with the result of the judgment and the result of the determination as to whether each of command current values obtained at predetermined control intervals increases or decreases.

25. A drive-force distribution method for a four-wheel-drive vehicle equipped with a drive-force transmission apparatus which transmits drive force to rear wheels or front wheels of the vehicle in accordance with a designated drive-force transmission ratio, comprising:

detecting vehicle speed and opening of a throttle valve of an engine of the vehicle;

calculating a command torque on the basis of the detected vehicle speed and the detected throttle opening, the command torque representing a torque to be distributed to the front wheels or the rear wheels; and calculating a command current to be supplied to the drive-force transmission apparatus, on the basis of the calculated command torque; and supplying the command current to the drive-force transmission apparatus in order to variably control the drive-force transmission ratio of the drive-force transmission apparatus, wherein the step of calculating a command current comprises determining a command current filter value on the basis of the detected vehicle speed and a command current filter map providing a command current filter value which changes in accordance with the vehicle speed, and adjusting the change speed of the command current in accordance with the determined command current filter value.

26. A drive-force distribution method according to claim 25, wherein a plurality of command current filter maps having different characteristics are provided for different traveling states of the vehicle, and the step of calculating a command current comprises obtaining a plurality of command current filter values on the basis of the vehicle speed and the command current filter maps, and selecting one of the command current filter values in accordance with the present traveling state of the vehicle.

27. A drive-force distribution method according to claim 26, wherein the step of calculating a command current comprises determining whether each of command current values obtained at predetermined control intervals increases or decreases from a previous value, and selecting one of the command current filter values in accordance with the result of the determination.

28. A drive-force distribution method according to claim 27, wherein the step of calculating a command current comprises judging a control state of the vehicle from a plurality of assumed control states at predetermined intervals, and selecting one of the command current filter values in accordance with the result of the judgment and the result of the determination as to whether each of command current values obtained at predetermined control intervals increases or decreases.

* * * * *